United States Patent
Mizushima et al.

(10) Patent No.: US 11,455,122 B2
(45) Date of Patent: Sep. 27, 2022

(54) STORAGE SYSTEM AND DATA COMPRESSION METHOD FOR STORAGE SYSTEM

(71) Applicant: Hitachi, Ltd., Tokyo (JP)

(72) Inventors: Nagamasa Mizushima, Tokyo (JP); Tomohiro Yoshihara, Tokyo (JP); Kentaro Shimada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/993,888

(22) Filed: Aug. 14, 2020

(65) Prior Publication Data

US 2021/0191658 A1  Jun. 24, 2021

(30) Foreign Application Priority Data

Dec. 20, 2019 (JP) .............................. JP2019-230475

(51) Int. Cl.
*G06F 3/06* (2006.01)

(52) U.S. Cl.
CPC .......... *G06F 3/0659* (2013.01); *G06F 3/0608* (2013.01); *G06F 3/0641* (2013.01); *G06F 3/0653* (2013.01); *G06F 3/0658* (2013.01); *G06F 3/0673* (2013.01)

(58) Field of Classification Search
CPC .... G06F 3/0659; G06F 3/0608; G06F 3/0641; G06F 3/0653; G06F 3/0658; G06F 3/0673
See application file for complete search history.

(56) References Cited

U.S. PATENT DOCUMENTS

| | | | | |
|---|---|---|---|---|
| 9,116,902 | B1* | 8/2015 | Shilane | G06F 16/1744 |
| 9,367,557 | B1 | 6/2016 | Lin et al. | |
| 10,824,599 | B2 | 11/2020 | Ohtsuji | |
| 10,838,990 | B1* | 11/2020 | Shilane | G06F 16/316 |
| 2008/0147983 | A1* | 6/2008 | Thomas | G06F 12/121 |
| | | | | 711/134 |
| 2012/0137059 | A1* | 5/2012 | Yang | G06F 3/0659 |
| | | | | 711/104 |
| 2013/0243190 | A1* | 9/2013 | Yang | G06F 3/0659 |
| | | | | 380/44 |

(Continued)

FOREIGN PATENT DOCUMENTS

JP  2019-046023 A  3/2019

OTHER PUBLICATIONS

Wayback web.archive.org/web/20180325035511/http://www.active-undelete.com:80/hdd_basic.htm that discloses Hard Disk Drive terminology (Year: 2018).*

(Continued)

*Primary Examiner* — William E. Baughman
*Assistant Examiner* — Janice M. Girouard
(74) *Attorney, Agent, or Firm* — Mattingly & Malur, PC

(57) ABSTRACT

Provided is a storage system in which a compression rate of randomly written data can be increased and access performance can be improved. A storage controller 22A includes a cache area 203A configured to store data to be read out of or written into a drive 29. The controller 22A groups a plurality of pieces of data stored in the cache area 203A and input into the drive 29 based on a similarity degree among the pieces of data, selects a group, compresses data of the selected group in group units, and stores the compressed data in the drive 29.

14 Claims, 20 Drawing Sheets

(56) References Cited

U.S. PATENT DOCUMENTS

2019/0171624 A1\* 6/2019 Douglis .............. G06F 16/1744
2020/0097181 A1\* 3/2020 Volvovski ............. G06F 3/0643
2020/0341668 A1\* 10/2020 Gonczi ................ G06F 3/0673

OTHER PUBLICATIONS

Notice of Reasons for Refusal dated Nov. 30, 2021 issue in corresponding Japanese Patent Application No. 2019-230475.

\* cited by examiner

FIG. 3

VOLUME MANAGEMENT TABLE
207

| VOL ID | VOL ATTRIBUTE | VOL CAPACITY | POOL ID | HOST VISIBLE |
|---|---|---|---|---|
| 0 | THIN PROVISIONING, REDUCTION OFF | 100GB | 0 | Yes |
| 10 | THIN PROVISIONING, REDUCTION ON | 200GB | 0 | Yes |
| 20 | NORMAL ALLOCATION, REDUCTION OFF | 500GB | 1 | Yes |
| 30 | SYSTEM (USED FOR GROUP MANAGEMENT) | 200GB | 0 | No |
| ... | ... | ... | ... | |

FIG. 4

POOL CONFIGURATION MANAGEMENT TABLE
208

| 51 | 52 | 53 | 54 |
|---|---|---|---|
| POOL ID | RAID GROUP ID | POOL CAPACITY | POOL USE CAPACITY |
| 0 | 0<br>1 | 10TB | 5TB |
| ... | ... | ... | ... |

FIG. 5
RAID CONFIGURATION MANAGEMENT TABLE
209

| RAID GROUP ID | RAID LEVEL | DRIVE ID | DRIVE TYPE | CAPACITY | USE CAPACITY |
|---|---|---|---|---|---|
| 0 | RAID5 | 0<br>1<br>2<br>3 | SSD | 5TB | 3TB |
| ... | | ... | ... | ... | ... |

FIG. 6

POOL ALLOCATION MANAGEMENT TABLE
210

| VOL ID (71) | VOL ADDRESS (72) | POOL ID (73) | POOL ADDRESS (74) | PRE-COMPRESSION SIZE (75) | POST-COMPRESSION SIZE (76) | SIMILARITY DEGREE (77) |
|---|---|---|---|---|---|---|
| 30 | 1000 | 0 | 05610 | 128KB | 54KB | 84% |
|  |  | 0 | 17480 | 128KB | 29KB | 97% |
| 30 | 1300 | 0 | 07140 | 128KB | 73KB | 71% |
|  |  | 0 | 14990 | 128KB | 61KB | 80% |
| 30 | 1500 | 0 | 06340 | 128KB | 92KB | 54% |
|  |  | 0 | 04720 | 128KB | 77KB | 66% |
| 30 | 1800 | 0 | 11390 | 128KB | 42KB | 90% |
|  |  | 0 | 10570 | 128KB | 39KB | 92% |
| ... | ... | ... | ... | ... | ... |  |

FIG. 7

DRIVE ALLOCATION MANAGEMENT TABLE
211

| POOL ID | POOL ADDRESS | RAID GROUP ID | DRIVE ID | DRIVE ADDRESS |
|---|---|---|---|---|
| 0 | 05610 | 0 | 0 | 0360 |
| 0 | 17480 | 1 | 2 | 1530 |
| 0 | 07140 | 1 | 3 | 0940 |
| 0 | 14990 | 1 | 3 | 0730 |
| 0 | 06340 | 0 | 1 | 1830 |
| 0 | 04720 | 0 | 0 | 1220 |
| 0 | 11390 | 1 | 2 | 0790 |
| … | … | … | … | … |

Columns: 81, 82, 83, 84, 85

FIG. 9
GROUP MANAGEMENT TABLE
212

| HOST VOL ID (901) | HOST VOL ADDRESS (902) | POSITION NUMBER (903) | SYSTEM VOL ID (904) | SYSTEM VOL ADDRESS (905) | GROUP NUMBER (906) | POSITION NUMBER (907) |
|---|---|---|---|---|---|---|
| 10 | 700 | 11 | 30 | 1300 | 1 | 7 |
| 10 | 500 | 8 | 30 | 1800 | 0 | 2 |
| 10 | 300 | 5 | 30 | None | None | None |
| 10 | 100 | 19 | 30 | 1500 | 1 | 10 |
| 10 | 200 | 10 | 30 | 1000 | 1 | 3 |
| 10 | 400 | 31 | 30 | 1800 | 0 | 5 |
| 10 | 600 | 17 | 30 | 1500 | 1 | 8 |
| 10 | 800 | 9 | 30 | 1000 | 1 | 3 |
| ... | ... | | ... | ... | | ... |

FIG. 10

MEMORY ALLOCATION MANAGEMENT TABLE
213

| VOL ID | VOL ADDRESS | BF TRANSFER STATE | BF ADDRESS | CACHE STATE | CACHE ADDRESS |
|---|---|---|---|---|---|
| 10 | 300 | | | [Dirty, Dirty, ... , Dirty] | 2000 |
| 10 | 200 | | | [Dirty, Dirty, ... , Dirty] | 2200 |
| 10 | 500 | | | [Dirty, Dirty, ... , Dirty] | 2500 |
| 30 | 1300 | NOT COMPLETED | None | [Dirty, Clean] | 3000 |
| 30 | 1800 | COMPLETED | 50 | [Dirty, Dirty] | 2100 |
| 30 | 1500 | COMPLETED | None | [Clean, Clean] | 2300 |
| 30 | 1000 | COMPLETED | 80 | [Dirty, Clean] | 3200 |
| ... | ... | ... | ... | ... | |

908 909 910 911 912 913

FIG. 14
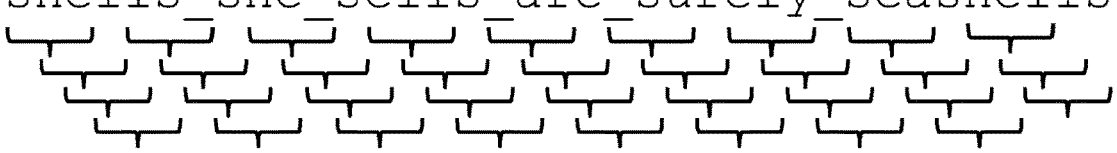
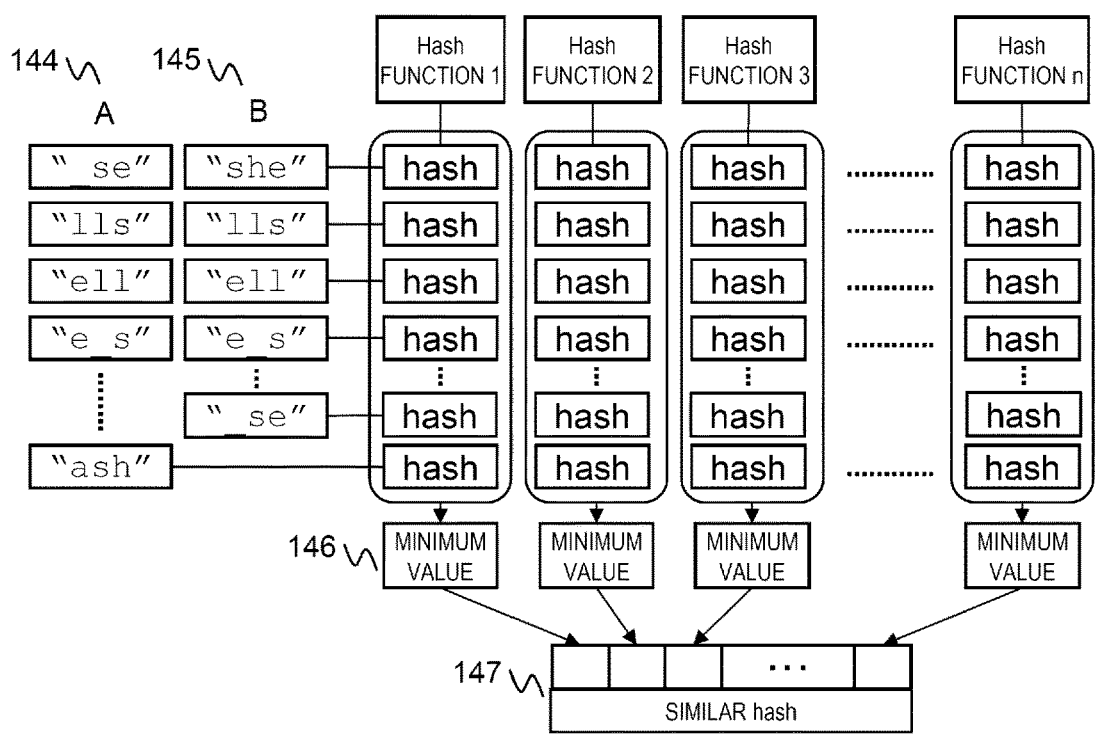

us 11,455,122 B2

STORAGE SYSTEM AND DATA COMPRESSION METHOD FOR STORAGE SYSTEM

CROSS-REFERENCE TO RELATED APPLICATION

The present application claims priority from Japanese application JP 2019-230475, filed on Dec. 20, 2019, the contents of which is hereby incorporated by reference into this application.

BACKGROUND OF THE INVENTION

1. Field of the Invention

The present invention relates to a storage system and a data compression method for the storage system.

2. Description of the Related Art

A storage system generally includes one or more storage devices. Each of the storage devices generally includes, for example, a hard disk drive (HDD) or a solid state drive (SSD) as a storage device. The storage system is accessed from one or a plurality of upper level devices (for example, a host computer 30) via a network such as a storage area network (SAN) or a local area network (LAN). Generally, reliability of the storage devices is improved by using a high reliability method according to a redundant array of independent (or inexpensive) disks (RAID) technique.

Some storage systems have a reversible compression function in order to reduce a data amount to be stored in a physical storage device and reduce cost. In some cases, a pre-processing is applied to data to be compressed in order to improve a compression rate as much as possible.

U.S. Pat. No. 9,367,557 specification (PTL 1) discloses such a technique. That is, in the technique disclosed in PTL 1, a file and sequence data written from an outside of a storage system are divided into units called chunks, similarity between the chunks is evaluated, the chunks are rearranged in order of similar chunks to create new sequence data, and the new sequence data is compressed by group units and stored in a storage device. A chunk rearranging list for restoring the original file and the sequence data is also stored in the storage device.

The storage system described in PTL 1 improves the compression rate by compressing the file and the sequence data written at a time and storing the compressed file and the sequence data after performing rearrangement based on the similarity. The data written into the storage system is not always of such a sequential nature, and may also be random and unrelated.

It is a problem to implement a storage system that improves the compression rate based on the similarity in a case of handling written data such as the latter. It is also a problem to improve access performance of the storage system when the storage system is implemented.

SUMMARY OF THE INVENTION

The present invention has been provided in view of the above circumstances, and an object thereof is to provide a storage system and a data compression method for the storage system that can increase a compression rate of randomly written data and improve access performance.

In order to achieve the above object, the storage system according to a first aspect includes a drive having a physical storage area, and a controller configured to process data input into and output from the drive. The controller includes a cache area configured to store data to be read out of or written into a drive. The controller groups a plurality of pieces of data stored in a cache area and input into the drive based on a similarity degree among the pieces of data, selects a group, compresses data of the selected group in group units, and stores the compressed data in the drive.

According to the invention, a compression rate of the randomly written data can be increased and access performance can be improved.

BRIEF DESCRIPTION OF THE DRAWINGS

FIG. 3 is a diagram showing a configuration example of a volume management table in FIG. 2.

FIG. 4 is a diagram showing a configuration example of a pool configuration management table in FIG. 2.

FIG. 5 is a diagram showing a configuration example of a RAID configuration management table in FIG. 2.

FIG. 6 is a diagram showing a configuration example of a pool allocation management table in FIG. 2.

FIG. 7 is a diagram showing a configuration example of a drive allocation management table in FIG. 2.

FIG. 9 is a diagram showing a configuration example of a group management table in FIG. 2.

FIG. 10 is a diagram showing a configuration example of a memory allocation management table in FIG. 2.

FIG. 14 is a diagram showing a similar hash calculation processing executed by the storage device in FIG. 2.

DESCRIPTION OF THE PREFERRED EMBODIMENTS

Figure 1:
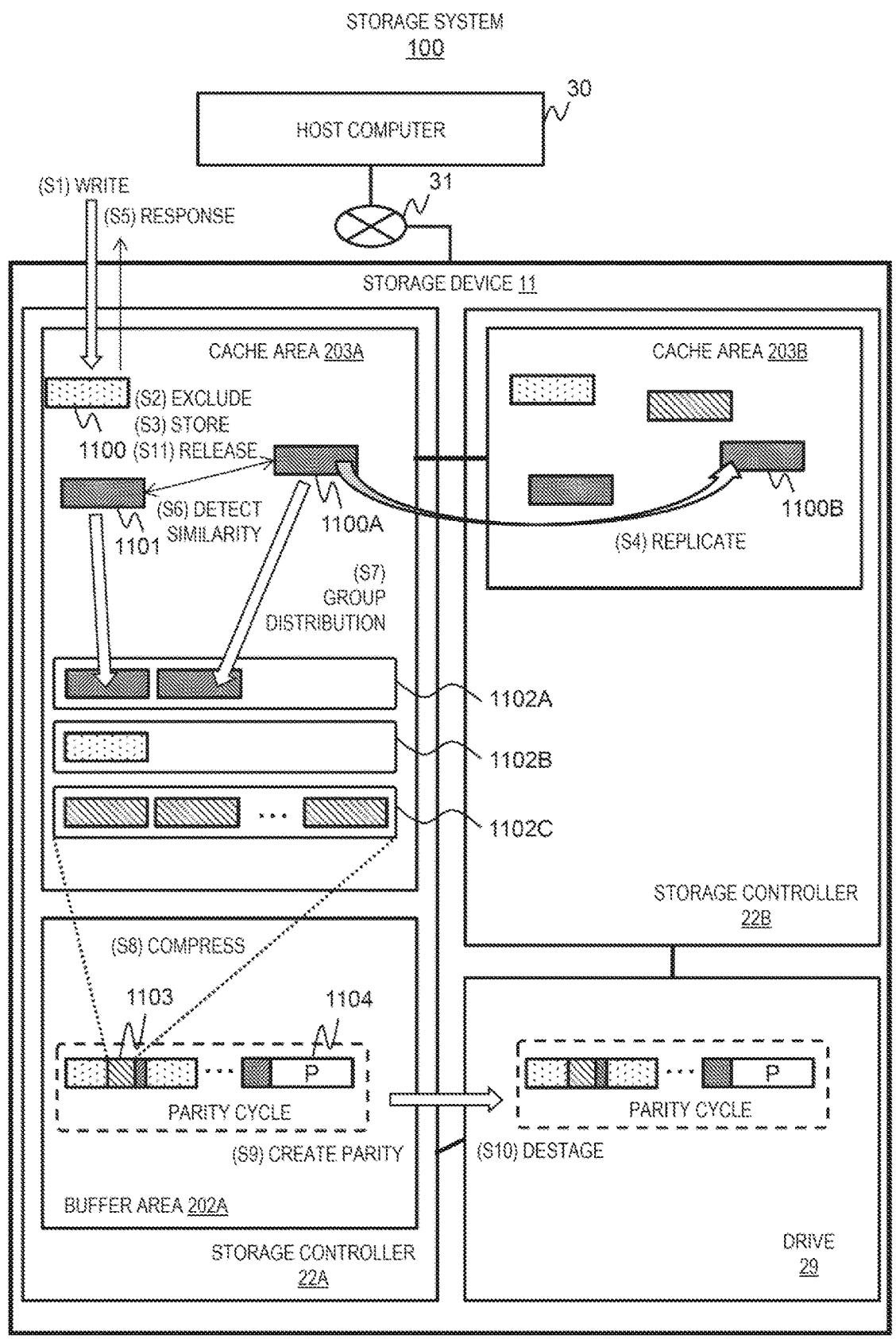
FIG. 1 is a block diagram showing a data write procedure involving data compression of a storage system according to an embodiment.

An embodiment will be described with reference to drawings. The embodiment described below do not limit the invention according to the claims, and all elements and combinations thereof described in the embodiment are not necessarily essential to the solution of the invention.

In the following description, an "interface unit" may include at least one of a user interface unit and a communication interface unit. The user interface unit may include at least one I/O device among one or more I/O devices (for example, an input device such as a keyboard and a pointing device, and an output device such as a display device) and a display computer. The communication interface unit may include one or more communication interface devices. The one or more communication interface devices may be one or more communication interface devices of the same type (for example, one or more network interface cards (NIC)), or may be two or more communication interface devices of different types (for example, an NIC and a host bus adapter (HBA)).

In the following description, a "memory unit" includes one or more memories. The at least one memory may be a volatile memory or a non-volatile memory. The memory unit is mainly used in processing executed by a processor unit.

In the following description, the "processor unit" includes at least one processor. The at least one processor is typically a central processing unit (CPU). The processor may include a hardware circuit (for example, an offload engine that assists the processing of the CPU) that performs a part or all of the processing.

In the following description, although information is described in an expression of an "xxx table", the information may be expressed in any data structure. That is, the "xxx table" can be referred to as "xxx information" in order to indicate that the information does not depend on the data structure. In the following description, a configuration of each table is an example, one table may be divided into two or more tables, and all or a part of two or more tables may be one table.

In the following description, a common reference numeral in reference numerals may be used when elements of the same type are described without distinction, and a reference numeral (or an element ID such as an identification number) may be used when the elements of the same type are described with distinction. For example, when a plurality of storage controllers are not distinguished, the storage controllers are described as "storage controllers 22", and when the storage controllers are distinguished, the storage controllers are described as a "storage controller 22A" and a "storage controller 22B". The same applies to other elements (for example, a cache area 203, a buffer area 202, and an address 1100).

In the following description, a "storage system" includes at least one storage device. The at least one storage device may be a general-purpose physical computer. The at least one storage device may be a virtual storage device, or may execute software-defined anything (SDx). For example, a software defined storage (SDS) (an example of the virtual storage device) or a software-defined datacenter (SDS) can be adopted as the SDx.

FIG. 1 is a block diagram showing a data write procedure involving data compression of a storage system according to the embodiment.

In FIG. 1, a storage system 100 includes the host computer 30 and a storage device 11. The host computer 30 is connected to the storage device 11 via a network 31 and is managed by a management computer (not shown).

The storage device 11 has one or more volumes (virtual storage areas). The storage device 11 includes a drive 29 having a physical storage area, and the storage controllers 22A and 22B that control the drive 29. The storage controller 22A includes a cache area 203A for caching data read out of or written into the drive, and a buffer area 202A for temporarily storing data at time of transfer. The storage controller 22B includes a cache area 203B for replicating data cached in the cache area 203A.

The host computer 30 may be a physical computer or a virtual computer executed by a physical computer. The host computer 30 may be a virtual computer executed in the storage system 100. Data is written from the host computer 30 to the storage controller 22A or the storage controller 22B of the storage device 11.

Hereinafter, a processing procedure in accordance with a data write command from the host computer 30 in the storage system 100 will be described. In the example of FIG. 1, a case where the storage controller 22A receives the write command from the host computer 30 will be described.

(S1) The storage device 11 receives the write command from the host computer 30 via the network 31. The write command includes data and a data allocation destination address 1100. A data unit when the storage device 11 processes the write command is, for example, 8 KB. When the data is less than 8 KB, in order to compensate for insufficient data of a peripheral address, data stored in the device is read and complemented to make the data 8 KB and then the storage device 11 processes the write command. When there is an unwritten part in the peripheral address, the part is managed as an indefinite value, and is temporarily complemented with zero data and processed. When the data is larger than 8 KB, the data is divided into one or more pieces of 8 KB data and remaining data that is less than 8 KB, which are all processed separately as 8 KB data by the above complementation. Therefore, in the following description, it is assumed that the data size handled by the storage device 11 is 8 KB. After receiving the write command, the storage device 11 starts write processing from S2 on.

(S2) In response to the write command, the storage device 11 ensures exclusiveness of a slot indicated by the allocation destination address 1100. Accordingly, data in the slot is prevented from being updated by another write command. A "slot" is a type of area unit in a volume (VOL). Specifically, the slot in the present embodiment is a unit for managing processes such as whether writing into the drive 29 was performed and whether transfer to the buffer area 202 was performed. A size of the slot is, for example, 256 KB. An area may be referred to as another name although it is referred to as a "slot" in the present embodiment.

(S3) The storage controller 22A stores data in an address 1100A corresponding to the data allocation destination address 1100 in the cache area 203A.

(S4) The storage controller 22A transfers the data stored in the cache area 203A to the storage controller 22B. The storage controller 22B stores the received data in an address 1100B in the cache area 203B corresponding to the allocation destination address 1100, and returns a response to the storage controller 22A to complete replication of the data in the storage device 11.

(S5) After completing the replication of the data, the storage device 11 responds to the host computer 30 with completion of writing via the network 31. At this time point, the host computer 30 recognizes that the writing is completed.

(S6) The storage controller 22A detects, among a plurality of pieces of data stored in the cache area 203A, for example, one or more pieces of data that are in a similar relationship with content of the data in the address 1100A. An address of the data that is in a similar relationship with the content of the data in the address 1100A is denoted by 1101.

In order to detect the data having a similar relationship, a value called a similar hash (a value of a small size such as 8 B representing a feature of data content) is calculated from content of 8 KB data. For example, the similar hash is a locality sensitive hash (LSH). The more similar the contents of two pieces of data, closer the values of the similar hashes of the two pieces of data are. The closeness of the values of the similar hashes means a shorter hamming distance. A specific similar hash calculation method will be described later.

(S7) The storage controller 22A generates a group in which the data cached in the cache area 203A is grouped based on a similarity degree among the data cached in the cache area 203A. Data that is grouped into each group may include data written based on a separate write request from the host computer 30. At this time, since the storage controller 22A stores a plurality of pieces of data for each group, one or more areas are ensured in the cache area 203A. A size of the area ensured for each group is, for example, 128 KB. Then, for example, the storage controller 22A transfers the data in the address 1100A and the data in the address 1101 to an area of one certain group 1102A. The number of pieces of data to be transferred is two or more, and for example, 16 pieces of 8 KB data in a similar relationship can be stored in one group. Data in a similar relationship detected by the method in (S6) is stored in areas of other groups 1102B and 1102C.

As will be described later, the storage controller 22A may perform deduplication processing before grouping the selected data and group only representative data after the processing. The deduplication processing is a processing of allocating N (N is an integer equal to or larger than 2) pieces of data having exactly equal content to one piece of representative data. By the deduplication processing, an actual amount of stored data can be reduced to one in N.

(S8) For example, the storage controller 22A selects a group (for example, the group 1102C) to be written from the cache area 203A to the drive 29, collectively compresses data included in the selected group, and additionally stores the data in an address 1103 in the buffer area 202A.

Here, the storage controller 22A selects a group to be compressed based on an access frequency of the group and the similarity degree among data included in the group. For example, the storage controller 22A selects, as the group to be compressed, a group whose access frequency is equal to or less than a first set value and whose similarity among the data included in the group is equal to or greater than a second set value. Accordingly, a group having a low access frequency and a high similarity degree among data is selected as a group to be compressed, and the group can be removed from the cache area 203A. Therefore, a drive capacity can be reduced, data with a high access frequency can be remained in the cache area 203A, and a cache hit rate can be improved, and thereby the access performance can be improved.

Further, the storage controller 22A may execute the compression of the group when a dirty cache ratio in the cache area 203A is equal to or larger than an upper limit value, and may suspend the compression of the group when the dirty cache ratio is less than the upper limit value. Accordingly, similar data capable of further increasing a compression degree can be held in the cache area 203 as much as possible while ensuring an area in a free state in which write data can be newly received in the cache area 203, the compression rate of data can be increased, and the access performance can be improved.

The compression processing is performed for each group until an amount equal to or more than a RAID parity cycle is accumulated in the buffer area 202A. At this time, the storage controller 22A may perform an encryption processing after the compression of the selected group, and store the compressed data after the encryption processing in the address 1103.

(S9) When the compressed data of one or more groups additionally stored in the buffer area 202A reaches an amount equal to or larger than a parity cycle, the storage controller 22A generates a parity for ensuring the compressed data and stores the parity in an address 1104 in the buffer area 202A.

(S10) The storage controller 22A transmits the compressed group (compressed data equal to or larger than the parity cycle of one or more groups) in the buffer area 202A and the parity corresponding thereto to the drive 29 and writes them to the drive 29 (destage processing).

(S11) When the destage processing is completed, the storage controller 22A releases the exclusiveness of the slot ensured in (S2).

Figure 2:
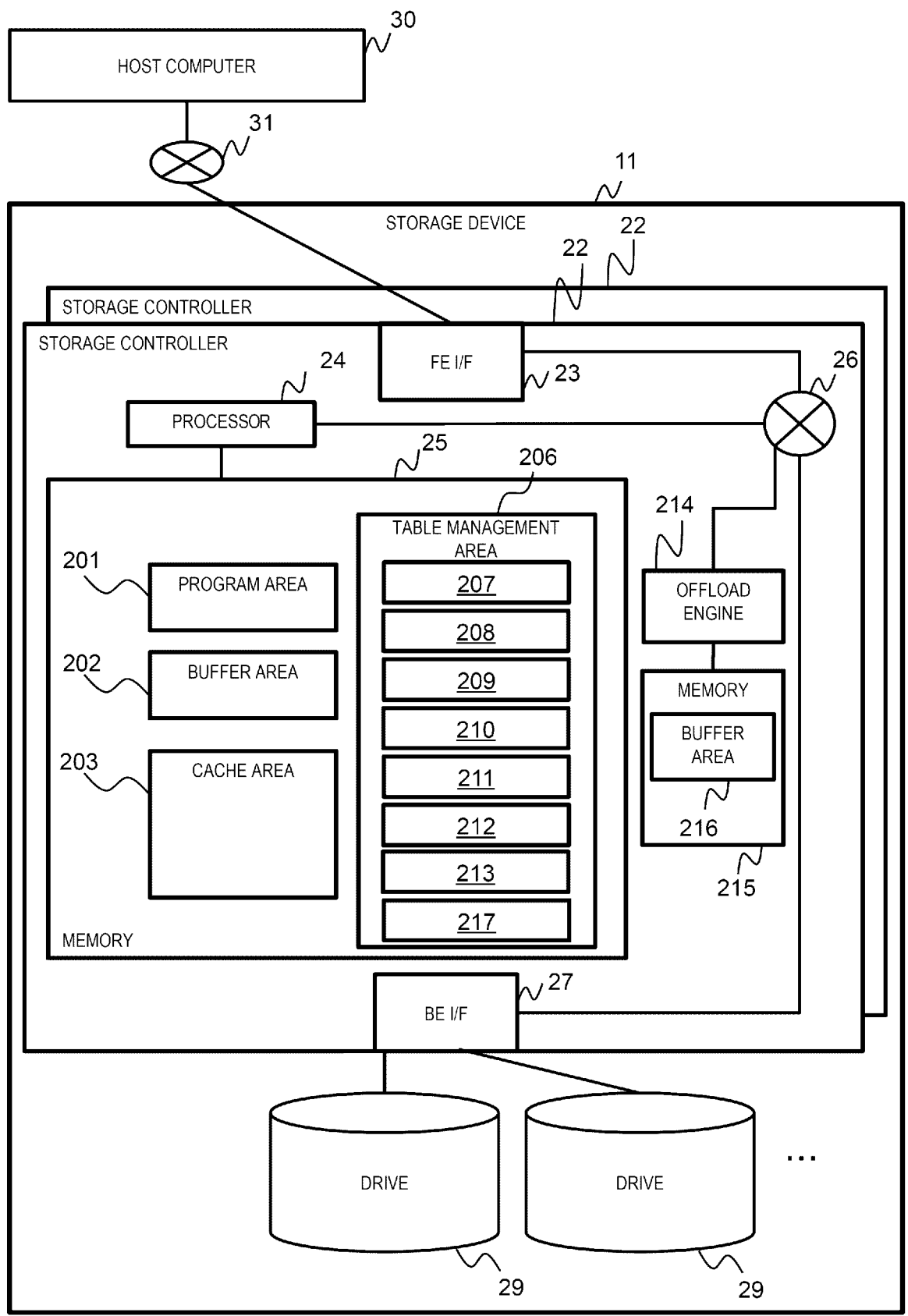
FIG. 2 is a block diagram showing a configuration example of hardware of the storage system according to the embodiment.

FIG. 2 is a block diagram showing a configuration example of hardware of the storage system according to the embodiment.

In FIG. 2, the storage device 11 includes one or more storage controllers 22 and a plurality of drives 29 connected to the one or more storage controllers 22.

Each storage controller 22 includes a front-end interface device (FE_I/F) 23, a processor 24, memories 25 and 215, a back-end interface device (BE_I/F) 27, an internal network 26, and an offload engine 214. The FE_I/F 23, the processor 24, the memory 25, the BE_I/F 27, and the offload engine 214 are connected via the internal network 26.

The FE_I/F 23 communicates with the host computer 30. The BE_I/F 27 communicates with the drive 29. The processor 24 controls the entire storage device 11.

The memory 25 stores programs and data used by the processor 24. The memory 25 includes a program area 201 for managing a program, the buffer area 202 which is a temporary storage area when transferring data, the cache area 203 for temporarily storing written data (data written in response to a write command) from the host computer 30 and read data (data read in response to a read command) from the drive 29, and a table management area 206 for storing various tables.

The table management area 206 stores a volume information management table 207 for holding information on volumes, a pool configuration management table 208 for holding information on pools, a RAID configuration management table 209 for holding information on RAID configuration, a pool allocation management table 210 for holding information on pool allocation, a drive allocation management table 211 for holding information on drive allocation, a group management table 212 for holding information on data allocation to the groups, a memory allocation management table 213 for holding information on memory allocation, and a least recently used (LRU) list table 217 for managing access frequencies of slots.

The drive 29 is a device having a nonvolatile data storage medium, and may be, for example, a solid state drive (SSD) or a hard disk drive (HDD). The plurality of drives 29 may constitute a plurality of RAID groups (also referred to as parity groups). Each RAID group includes one or more drives 29.

The offload engine 214 is a hardware circuit that assists the processing performed by the processor 24, and executes a part or all of the processing such as similarity detection, compression, deduplication, encryption, and parity generation, which are performed in the data write described with reference to FIG. 1, at a higher speed than the processor 24. Similarly, a part or all of the processing, such as decompression, decoding and parity recovery (only during drive failure), which are performed in data read (not shown) are executed at a higher speed than the processor 24.

The memory 215 is a dedicated memory directly connected to the offload engine 214. The memory 215 has a buffer area 216 which is a temporary storage area at the time of data transfer. The memory 215 also stores data handled by the offload engine 214 and information relating to the processing. By providing the memory 215, a transfer amount and transfer time between the internal network 26 and the memory 25 via the processor 24 and the offload engine 214 can be reduced, and the performance can be improved.

The FE_I/F 23 and the BE_I/F 27 are examples of an interface unit. The memories 25 and 215 are examples of a memory unit. The processor 24 and the offload engine 214 are examples of a processor unit.

FIG. 3 is a diagram showing a configuration example of a volume management table in FIG. 2.

In FIG. 3, the volume management table 207 has an entry for each volume. Each entry stores information on a VOL_ID 41, a VOL attribute 42, a VOL capacity 43, and a pool ID 44.

The VOL_ID 41 is an ID of each volume managed by the storage device 11. The VOL attribute 42 indicates attributes of each volume. The attributes of each volume are, for example, a volume of thin provisioning, a volume of normal allocation, a data reduction is valid (ON) or invalid (OFF), and a system volume. The system volume is a volume for the storage device 11 to manage a group including data having a similar relationship, and is a region that is not directly visible from the host computer 30. The volume capacity 43 indicates a capacity of each volume. The pool ID 44 is an ID of a pool associated with each volume.

By referring to the volume attribute 42 of the volume management table 207 in the destage processing, the processor 24 can determine a volume for which what kind of processing is required when a write/read command of data is received from the host computer 30. For example, the volume attribute 42 of a volume having the VOL_ID 41 of "10" is "thin provisioning, reduction ON". Accordingly, a pool is dynamically allocated to a slot as necessary, and the data write described with reference to FIG. 1 is performed in response to the write command of the host computer 30.

For example, the volume attribute 42 of a volume having the VOL_ID 41 of "0" is "thin provisioning, reduction OFF". Accordingly, a pool is dynamically allocated to a slot as necessary, and the data write excluding data reduction processing (deduplication and compression) is performed in response to the write command of the host computer 30.

For example, the volume attribute 42 of a volume having the VOL_ID 41 of "30" is "normal assignment, reduction OFF". Accordingly, the data write excluding data reduction processing (deduplication and compression) is performed in response to the write command of the host computer 30 in a pool capacity range allocated when the volume is created.

FIG. 4 is a diagram showing a configuration example of a pool configuration management table in FIG. 2.

In FIG. 4, a pool is a logical storage area configured based on one or more RAID groups. The pool configuration management table 208 has an entry for each pool. The entry stores information on a pool ID 51, a RAID group ID 52, a pool capacity 53, and a pool use capacity 54.

The pool ID 51 is an ID of each pool managed by the storage device 11. The RAID group ID 52 is an ID of each of one or more RAID groups that are the basis of the pool. The pool capacity 53 indicates a capacity of the pool. The pool use capacity 54 indicates a total amount of an area allocated to a volume in the pool capacity of the pool.

FIG. 5 is a diagram showing a configuration example of a RAID configuration management table in FIG. 2.

In FIG. 5, the RAID configuration management table 209 has an entry for each RAID group in which the RAID configuration is to be managed. Each entry stores information on a RAID group ID 61, a RAID level 62, a drive ID 63, a drive type 64, a capacity 65, and a use capacity 66.

The RAID group ID 61 is an ID of each RAID group managed by the storage device 11. The RAID level 62 indicates a type of a RAID algorithm applied to the RAID group. The drive ID 63 is an ID of each of one or more drives constituting the RAID group. The drive type 64 indicates a type of drives (for example, an HDD or an SSD) that constitute the RAID group. The capacity 65 indicates a capacity of the RAID group. The use capacity 66 indicates a capacity being used of the capacity of the RAID group.

FIG. 6 is a diagram showing a configuration example of a pool allocation management table in FIG. 2.

In FIG. 6, the pool allocation management table 210 has an entry for each VOL address (address indicating a slot in a volume) of a target slot that manages allocation of a pool. Each entry stores information of a VOL_ID 71, a VOL address 72, a pool ID 73, a pool address 74, a pre-compression size 75, a post-compression size 76, and a similarity degree 77.

The VOL_ID 71 is an ID of a volume that is managed by the storage device 11 and to which a slot identified by a VOL address belongs. The VOL address 72 is the VOL address of the slot. The pool ID 73 is an ID of each pool including a data area allocated to store data obtained by compressing data of two groups (128 KB for each) included in each slot (256 KB). The pool address 74 is an address (an address belonging to a pool) of a data area allocated to store data obtained by separately compressing data of two groups. The pre-compression size 75 indicates a data size before compression of each group (128 KB for each). The post-compression size 76 indicates a data size after compression of each group. The similarity degree 77 is a value indicating a strength of the similarity relationship between 16 pieces of 8 KB data constituting each group. The similarity degree 77 of 0% indicates that there is no similarity relationship in content, and the similarity degree 77 of 100% indicates that the content is exactly matched (high potential). In general, it can be expected that the higher the similarity degree 77 of the group, the higher the compression rate is (the smaller the post-compression size 76 is).

According to a reversible compression algorithm used by the storage device 11, based on a sliding dictionary compression, a character string that matches past character strings is found and replaced with a short code (a length matching a distance to a discovery position) to reduce the data amount. For example, 28 bytes are reduced if a character string that matches 30 bytes is found and replaced with a short code of 2 bytes. Data having a high similarity degree includes plural common character strings, and the higher the similarity degree of data in the group to be compressed, the higher the compression rate is, so that the dictionary compression works effectively.

FIG. 7 is a diagram showing a configuration example of a drive allocation management table in FIG. 2.

In FIG. 7, the drive allocation management table 211 has an entry for each pool address for managing drive allocation. Each entry stores information on a pool ID 81, a pool address 82, a RAID group ID 83, a drive ID 84, and a drive address 85.

The pool ID 81 is an ID of a pool to which a pool address belongs. The pool address 82 is a pool address managed by the storage device 11. The RAID group ID 83 is an ID of a RAID group that is a basis of a data area indicated by the pool address. The drive ID 84 is an ID of a drive that is the basis of the data area indicated by the pool address. The drive address 85 is a drive address corresponding to the pool address.

Figure 8:
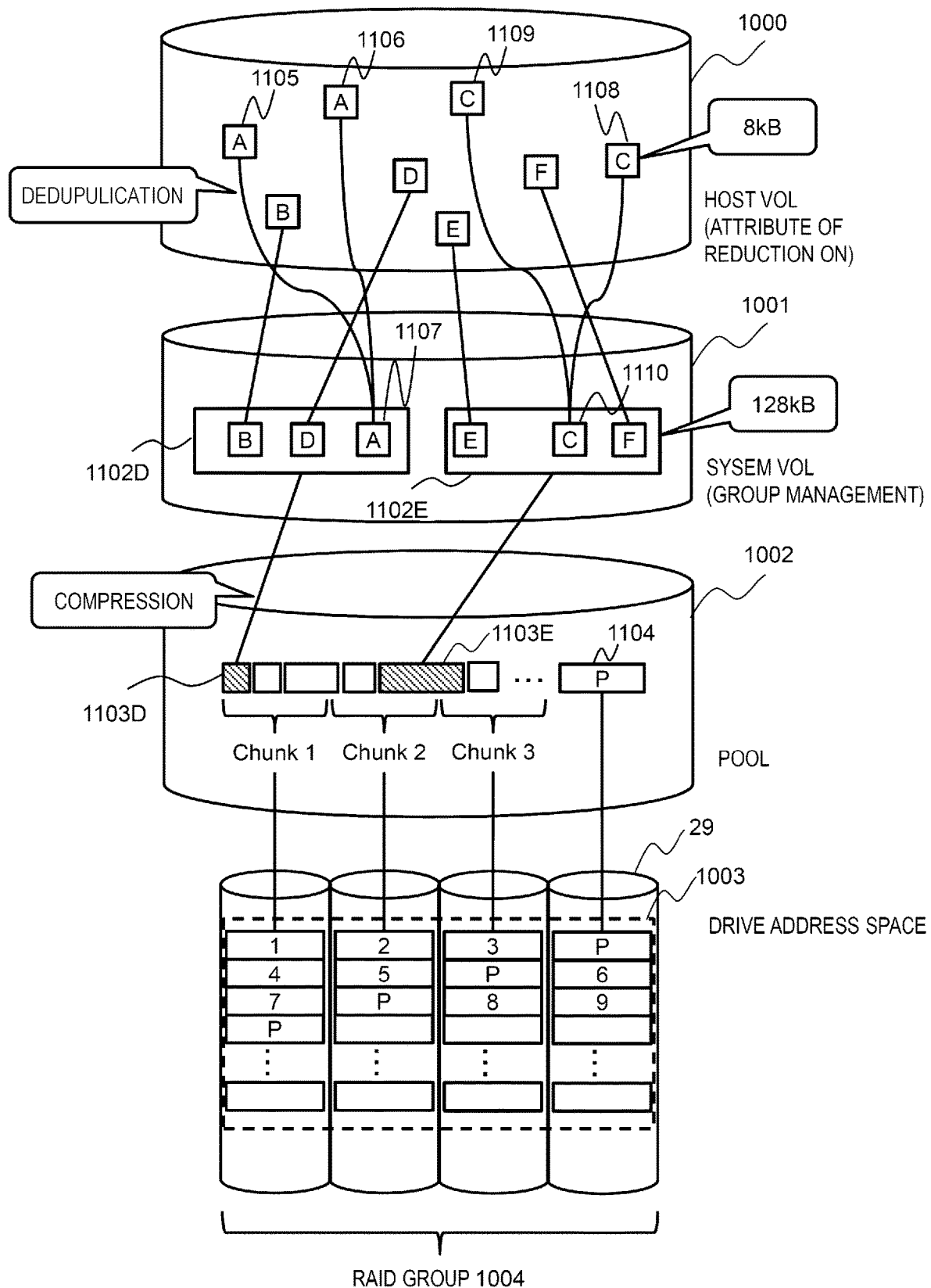
FIG. 8 is a diagram showing a configuration example of a logical storage hierarchy managed by a storage device in FIG. 2.

FIG. 8 is a diagram showing a configuration example of a logical storage hierarchy managed by the storage device in FIG. 2.

In FIG. 8, a host VOL 1000 is a volume to which the thin provisioning is applied and the data reduction is valid, and is provided to the host computer 30. A system VOL 1001 is a volume for managing a group which is a compression unit at the time of data reduction, and is not directly visible from the host computer 30.

8 KB data addresses in the host VOL 1000 are associated with a corresponding 8 KB data address included in the group in the system VOL 1001. In the example of FIG. 8, three addresses in a group 1102D are associated with three addresses storing contents "A, B and D" in the VOL 1000, and three addresses in a group 1102E are associated with the three addresses storing contents "C, E and F" in the VOL 1000. Corresponding destinations of addresses storing the contents "A, B and D" and "C, E and F" are respectively included in the same groups 1102D and 1102E. This is because similar relationship in the contents can be determined by the similarity detection (S6) in FIG. 1.

When the deduplication processing is performed, one 8 KB data address of the system VOL 1001 may be associated with a plurality of 8 KB data addresses in the host VOL 1000. Although not shown, one 8 KB data address of the system VOL may be associated with a plurality of 8 KB data addresses of different host VOLs. In the example of FIG. 8, one 8 KB data address 1107 in the group 1102D is associated with two different 8 KB data addresses 1105 and 1106 storing the same content "A", one 8 KB data address 1110 in the group 1102E is associated with two different 8 KB data addresses 1108 and 1109 storing the same content "C".

Each of the two groups (128 KB for each) included in the slot (256 KB) in the system VOL 1001 is associated with a data area in the pool 1002 as a storage destination of the compressed group data. In the example of FIG. 8, a data area 1103D is associated with the group 1102D, and a data area 1103E is associated with the group 1102E. Since the groups are compressed, a size of each data area in the pool 1002 corresponding to each group is equal to or smaller than a group size (128 KB).

A space of the pool 1002 is divided into units called chunks. Each chunk is associated with a drive address space 1003. The drive address space 1003 is a physical data storage space provided by a plurality of drives 29 (for example, four) constituting the RAID group 1004. The size of a parity 1104 generated in parity generation processing is a chunk size. The drive address space 1003 includes a plurality of RAID cycles. In order to recover data loss due to failure of the drives 29 by the RAID technique, the parity chunk P of each RAID cycle is associated with one drive to fit in.

The allocation from the host VOL 1000 to the system VOL 1001 is managed based on the group management table 212 shown in FIG. 9. Details of the table will be described later. An allocation from the system VOL 1001 to the pool 1002 is managed based on the pool allocation management table 210 in FIG. 6. An allocation from the pool 1002 to the drive address space 1003 is managed based on the drive allocation management table 211 in FIG. 7.

FIG. 9 is a diagram showing a configuration example of a group management table in FIG. 2.

In FIG. 9, the group management table 212 is a table for managing a group of the system VOL 1001 corresponding to the 8 KB data of the host VOL 1000 in FIG. 8, and has an entry for each address of 8 KB data to be managed. Each entry stores information on a host VOL_ID 901, a host VOL address 902, a position number 903, a system VOL_ID 904, a system VOL address 905, a group number 906, and a position number 907.

The host VOL_ID 901 is an ID of a volume (that is, the host VOL 1000) that is managed by the storage device 11 and to which a slot having the 8 KB data to be managed corresponding to a group belongs. The host VOL address 902 is an address of a slot to which the 8 KB data to be managed belongs. The position number 903 is a number in a range of 0 to 31 indicating a location where the 8 KB data is positioned in the slot (256 KB) to which the 8 KB data to be managed belongs, and a head is set to be 0 and an end is set to be 31.

The system VOL_ID 904 is an ID of a volume that is managed by the storage device 11 and to which a slot including a group of the system VOL 1001 corresponding to the 8 KB data of the host VOL 1000 belongs. The system VOL address 905 is an address of a slot including a group of the system VOL 1001 corresponding to the 8 KB data to be managed. The group number 906 is a number of a group of the system VOL 1001 corresponding to the 8 KB data to be managed, and is 0 or 1. The position number 907 is a number in a range of 0 to 15 indicating a location where the 8 KB data corresponds in the group of the system VOL 1001 (128 KB) corresponding to the 8 KB data to be managed, and a head is set to be 0 and an end is set to be 15.

For 8 KB data of an entry of a third row in which "None" is set in all of the system. VOL address 905, the group number 906, and the position number 907, grouping indicated by group allocation of (S7) in FIG. 1 is incomplete, indicating that a corresponding destination group of the system VOL 1001 is in a state of undetermined. When the grouping is completed, an address and numbers are registered in the items.

Two pieces of 8 KB data managed by entries of a fourth row and a seventh row are associated with the same group of the system VOL 1001, indicating that contents of both pieces of data are in a similar relationship. Two pieces of 8 KB data managed by entries of a second row and a sixth row are also associated with the same group of the system VOL 1001, indicating that contents of both pieces of data are in a similar relationship. Two pieces of 8 KB data managed by entries of a fifth row and an eighth row are associated with the same group of the system VOL 1001 and position numbers are also the same, which accordingly indicates that contents of both data are in a replication relationship.

FIG. 10 is a diagram showing a configuration example of a memory allocation management table in FIG. 2.

In FIG. 10, the memory allocation management table 213 has an entry on a slot address basis for a slot that uses the cache area 203 and the buffer area 202. Each entry stores information on a VOL_ID 908, a VOL address 909, a buffer (BF) transfer state 910, a buffer (BF) address 911, a cache state 912, and a cache address 913.

The VOL_ID 908 is an ID of a volume to which a slot identified by a VOL address belongs. The VOL address 909 is a slot address of the host VOL 1000 or the system VOL 1001.

The BF transfer state 910 indicates whether data of a group included in a slot to be managed by the system VOL 1001 has been transferred to the buffer area 202 for temporary holding, in which "not completed" indicates that the data has not yet been transferred, and "completed" indicates that the data has already been transferred. A slot to be managed by the host VOL 1000 does not use the item.

The BF address 911 indicates an address in the buffer area 202 to which the group data of the compressed system VOL 1001 is transferred. The slot to be managed by the host VOL 1000 does not use the item. When the BF transfer state 910 is "not completed", it means that "None" is set in the BF address 911 and that the group data included in the slot to be managed is not compressed. When the BF transfer state 910 is "completed" and the BF address 911 has a value, it means that the compressed group data is held in the buffer area 202. When the BF transfer state 910 is "completed" and the BF address 911 is "None", the compressed group data in the buffer area 202 is already stored into the drive 29, and an address of a used part of the buffer area 202 is released.

The cache state 912 indicates a storage state of the data of the slot to be managed by the host VOL 1000 or the system VOL 1001 in the drive 29. "Dirty" data in the cache state 912 means a state in which the storage into the drive 29 is not completed, and "Clean" data means a state in which the storage into the drive 29 is completed. In the cache state 912 of a host VOL slot, the cache state is managed on a 32 pieces of 8 KB data basis, and is managed on a two pieces of 128 KB basis in the cache state 912 of a system VOL slot. When the cache state 912 of the system VOL slot changes from "Dirty" to "Clean" in both two groups, a use address of the buffer area 202 is released, and "None" is set to the BF address 911. However, even in the state of "Clean", data of the groups remains in the cache area 203 in a state of not compressed. A read command of the data from the host computer 30 to the storage device 11 causes a cache hit until the data falls from the cache.

The cache address 913 is an address of a part of the cache area 203 allocated to store data of the slot to be managed by the host VOL 1000 or the system VOL 1001. A slot in which the cache state 912 is all "Clean" can be removed from the cache. When removed from the cache, an entry of the slot is deleted from the memory allocation management table 213.

Figure 11:
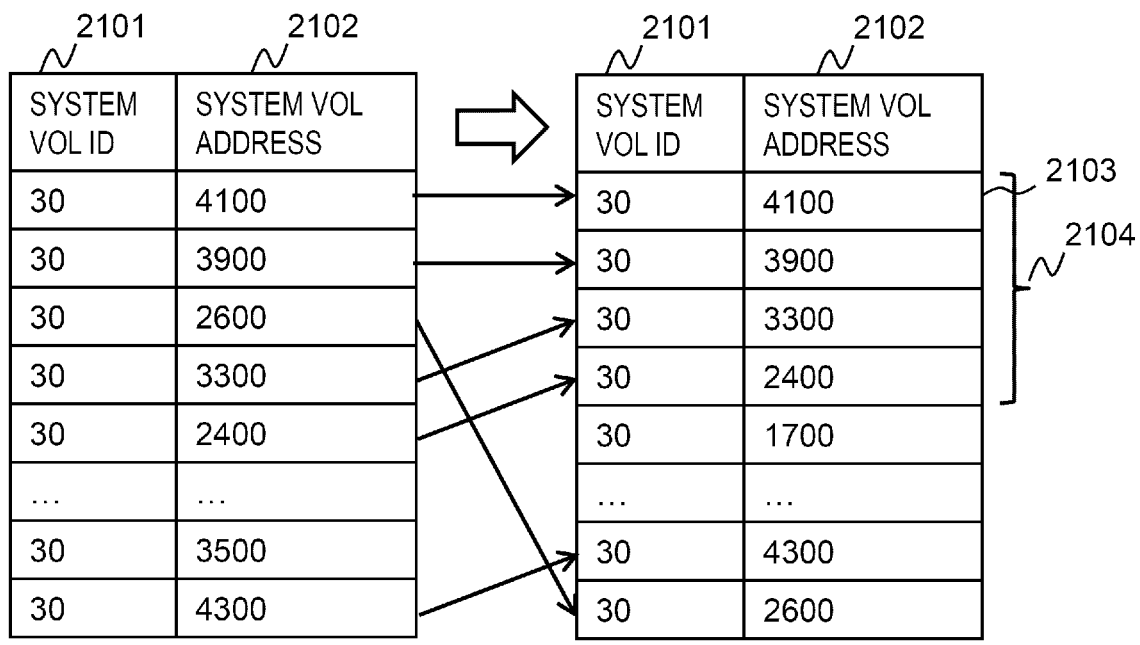
FIG. 11 is a diagram showing an LRU list table in FIG. 2 and transition thereof.

FIG. 11 is a diagram showing an LRU list table in FIG. 2 and transition thereof.

In FIG. 11, the LRU list table 217 manages an access frequency of a slot in order to select a group to be compressed. A system VOL ID 2101 indicates an ID of a system VOL to which a slot for managing the access frequency belongs. A system VOL address 2102 indicates an address of a slot for managing the access frequency. The upper position a slot in the list is in, the lower the access frequency is.

When certain data is accessed from the host computer 30, a slot (for example, address=2600) containing the access data moves to a lowest position of the list, and all slots (for example, addresses=3300, 2400, 4300, etc.) that are in lower positions than that slot move above by a single stage. When such a moving process is performed, slots including data having a lower access frequency are gathered in an upper position of the list. The group to be compressed can be selected from, for example, two groups included in a slot (for example, address=4100) positioned at an uppermost 2103 of the list.

Figure 12:
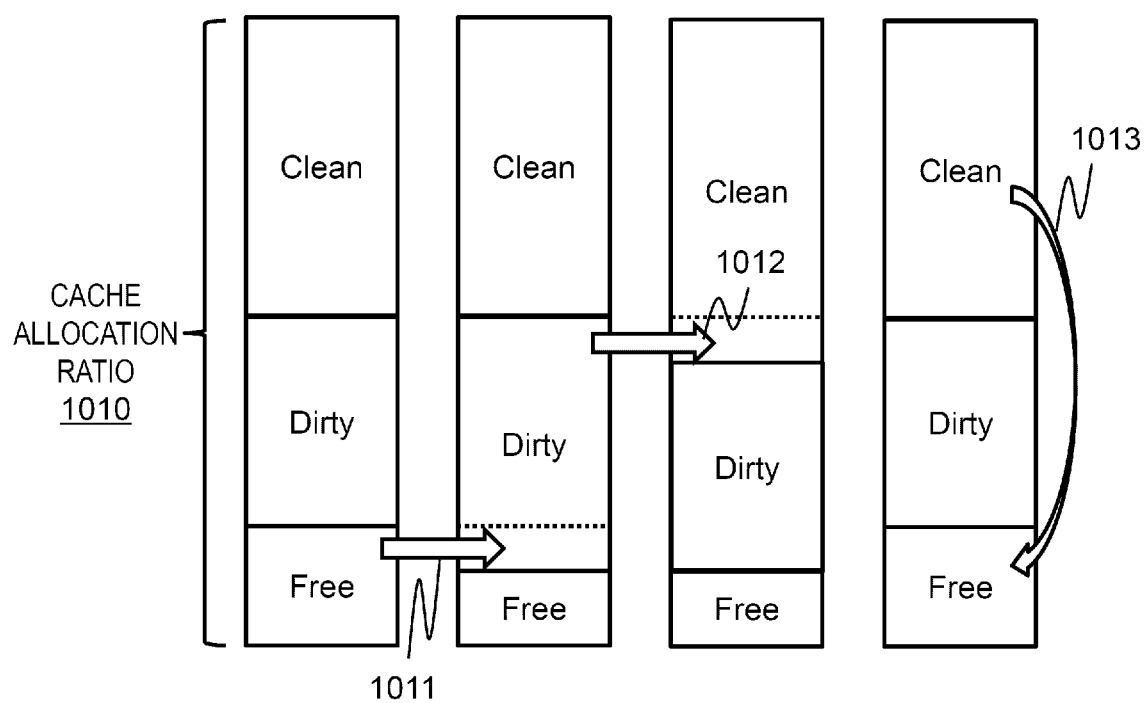
FIG. 12 is a diagram showing a change in a resource allocation ratio of a cache memory in the storage device in FIG. 2.

FIG. 12 is a diagram showing a change in a resource allocation ratio of a cache memory in the storage device in FIG. 2.

In FIG. 12, the cache area 203 in FIG. 2 temporarily holds data of slots of a host volume or a system volume. Depending on a data holding state, memory resources of the cache area 203 are divided into the following three states.

An area part in which data is held and the data is already stored in the drive 29 is "Clean". An area part in which data is held and the data is not yet stored in the drive 29 is "Dirty". An area part in the cache area 203 in which no data is held is "Free". The cache area 203 is allocated at an allocation ratio 1010 of the three states.

When a data write command from the host computer 30 is received and data is newly held in the cache area 203, a resource in the Free state is used, and the area part is changed to the dirty state (1011). At this time, the ratio of "Free" in the cache area 203 is reduced, and the ratio of Dirty is increased.

When the dirty state data held in the cache area 203 is stored in the drive 29, the data holding area changes from the Dirty state to the Clean state (1012). At this time, the ratio of "Dirty" in the cache area 203 is reduced, and the ratio of Clean is increased.

It is necessary to release the holding area in the Clean state in order to increase areas in the Free state in which the write data is newly received in the cache area 203. At this time, since the data of the holding area in the clean state has already been stored in the drive 29, the data is not lost as the storage device 11 even if the holding area in the clean state is released. Accordingly, a released area changes from the Clean state to the Free state (1013). At this time, the ratio of "Clean" in the cache area 203 is reduced, and the ratio of Free is increased.

The memory resources of the cache area 203 are managed in a life cycle as described above. It is necessary to perform the processing of (S8) compression to (S10) destage in FIG. 1 in order to change the dirty state indicated by 1012 in FIG. 12 from the Dirty state to the Clean state. In order to prepare the resource in the Free state after receiving the data write command from the host computer 30, it takes a long time from (S1) write to (S5) response when the dirty state is changed into the clean state by the processing of (S8) compression to (S10) destage and changed into the Free state by releasing the area of the Clean state.

Therefore, when a ratio of the resources in the Dirty state reaches a certain threshold value, the storage controller 22 in FIG. 2 performs processing starting from (S8) compression to (S10) destage on the group data in the cache area 203, and changes the Dirty state to the Clean state in advance. As a result, when the storage controller 22 receives the write command, the storage controller 22 only releases the area in the Clean state and immediately prepares the resource in the Free state, and time from (S1) write to (S5) response can be shortened.

When the ratio of the resource in the Dirty state reaches the certain threshold value, the group selected to be compressed in (S8) is a group included in the slot (that is, an LRU slot) that is not accessed for a longest time at this time point in the cache area 203.

A method of selecting a group is not limited to this method. A plurality of slots (M (M is an integer equal to or more than 2) may be selected in descending order of time when the slots are not accessed. Out of groups (2M) included in the slots, a group having a highest similarity degree 77 in the pool allocation management table in FIG. 6 may be selected to be compressed in (S8). For example, the list upper position range 2104 of FIG. 11 includes a plurality of slots (M=4) that have not been accessed for a long time. The group having the highest similarity degree 77 is selected among the eight groups included in the slots.

Advantages of the method are described below. A group data having a low similarity degree is expected to have a low compression rate (data reduction amount is small). Therefore, it is better to remain the group data in the cache area 203 without being compressed. If there are more similar pieces of data in the newly received write data, and the similarity degree 77 is increased by re-creating the group above the cache area 203, the compression rate may be improved. On the other hand, since a group data having a high similarity degree can be expected to have a high compression rate (data reduction amount is large), even if the group data is remained in the cache area 203, it cannot be expected that there is more similar data in the newly received write data, and there is a low potential that the compression rate is improved even if the group is re-created. Therefore, it is desirable that the group having the highest similarity degree is selected to be compressed in (S8).

Figure 13:
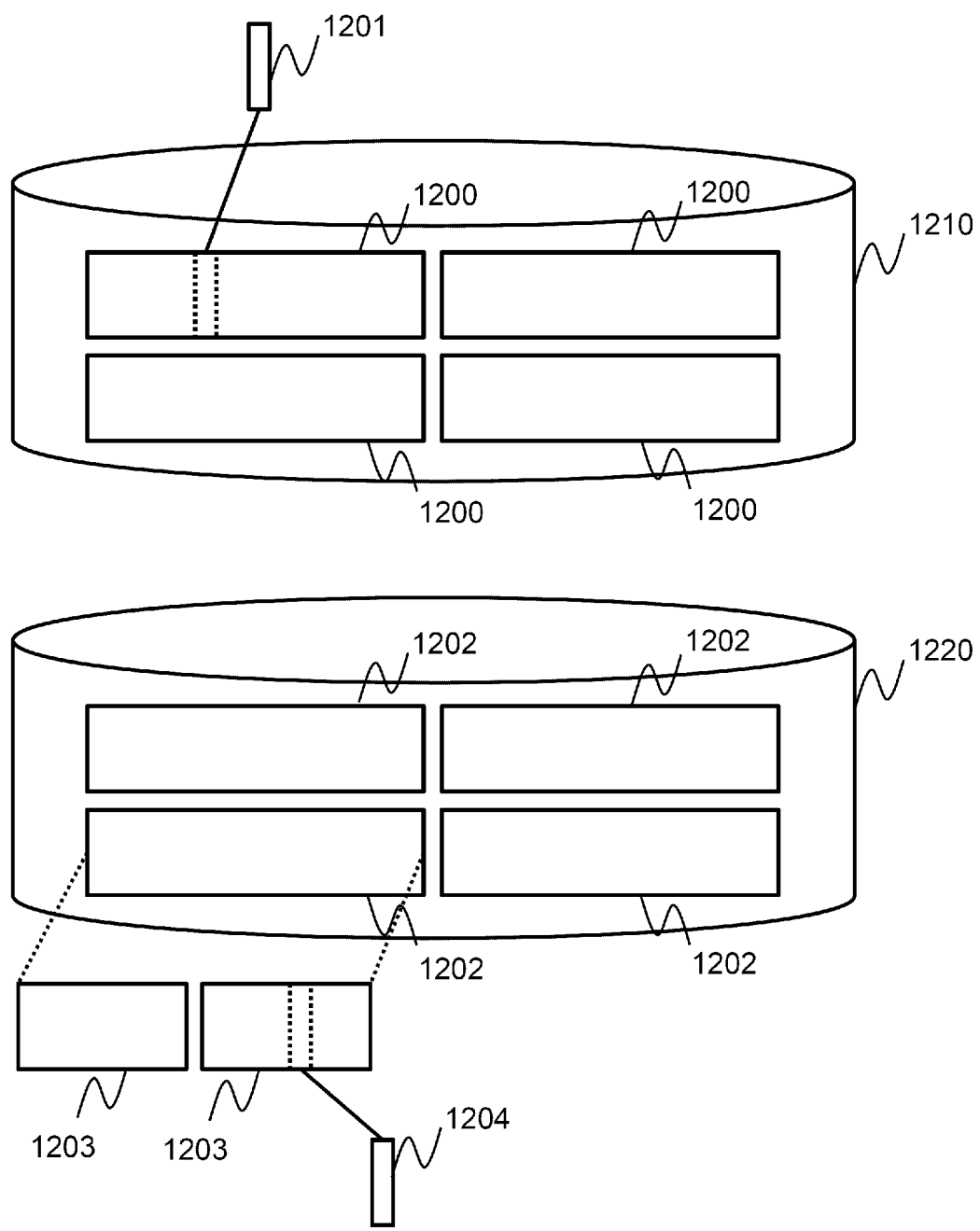
FIG. 13 is a diagram showing a configuration example of slots and groups in the storage device in FIG. 2.

FIG. 13 is a diagram showing a configuration example of the slots and the groups in the storage device in FIG. 2.

In FIG. 13, 8 KB data 1201 written by the write command is managed by a volume 1210 that is visible from the host computer 30. An address space of the volume 1210 includes a plurality of slots 1200, and the allocation destination address 1100 of the 8 KB data 1201 written by the write command is included in an address space occupied by one of the slots 1200.

"Ensure exclusiveness of the slot" is an operation for preventing reading and writing on a slot indicated by an address designated by the read command and the write command from the host computer 30, and information for the host computer 30 to recognize the ensured exclusiveness is managed. A type of the information may be any type as long as it can identify a bit map or time information. In the present embodiment, the "slot" is an area unit in a volume (for example, a volume according to thin provisioning), whereas a "data area" is an area allocated to the slot (for example, a pool area that is a region in the pool). For example, 32 pieces of 8 KB data can be stored in the pool area allocated to one 256 KB slot in the volume.

A group including 16 pieces of 8 KB data in a similar relationship is managed by another volume 1220 that is invisible from the host computer 30. An address space of the volume 1220 includes a plurality of slots 1202. Each slot 1202 in the volume 1220 includes two groups 1203. Addresses of the two groups 1203 are included in an address space occupied by the slot 1202 including the two groups 1203. Addresses of 16 pieces of 8 KB data 1204 in a similar relationship included in one group 1203 are included in an address space occupied by the group 1203.

FIG. 14 is a diagram showing a similar hash calculation processing executed by the storage device in FIG. 2. In FIG. 14, for the sake of simplicity, a case where the number of target data of a similar hash is two (data A and B), and the size of each data is 37 B is shown as an example. Even if the number and the size of data are increased, the calculation method of similar hashes is the same.

In FIG. 14, for each of the data A and B, for example, 35 consecutive three characters starting from a Kth character are extracted. Here, k is 1 to 35. Hereinafter, the three characters are referred to as words. Strength of similarity is evaluated by determining whether two pieces of data include a large number of common words. A word may exist at any position in each of the data A and B, and is extracted while changing a starting point (that is, k) by one byte step.

Next, for each of the data A and B, frequency order tables 141 and 142 indicating appearance frequencies (hereinafter, referred to as frequency) of 35 words are created. In each of the frequency order tables 141 and 142, words are arranged in order from a highest frequency. Words with small frequencies (for example, word of one time) are excluded from the frequency order tables 141 and 142.

In FIG. 14, common words in the two frequency order tables 141 and 142 are connected by a line. A strength S of the similarity relationship between the data A and B can be understood by dividing the number of common words (number of elements in a product set) by the number of elements in a sum set of words in the two frequency order tables 141 and 142. In the example, since the number of common words is 6 and the number of elements in the sum set is 11, the strength S=6/11.

A reason why the words with small frequencies are removed from the frequency order tables 141 and 142 is that a word with a small frequency in a sliding dictionary compression is less likely to be a matching character string, and the compression rate can be effectively increased by evaluation of commonality of a more frequently used word than a less frequently used word.

Although the size of a word is set to 3 bytes in the example of FIG. 14, the invention is not limited thereto. Since in most cases in a sliding dictionary compression, about 3 to 4 bytes is set as a minimum detection length of a matching character string, about 3 to 4 bytes is desirable.

When frequency order tables of all data are managed as attached information thereof and used for calculating the strength S of the similarity relationship therebetween, a storage amount of management information in the storage device 11 increases. Therefore, even if the frequency order tables of all data are not managed, an LSH algorithm called b-bit Min-wise Hash that can approximately evaluate the strength S of the similarity relationship between two pieces of data therein is applied. The algorithm is shown below.

N hash functions are prepared. Next, a hash value is calculated by applying each of ten words 144 appearing in the frequency order table 141 of the data A to n (n is an integer equal to or larger than 2) hash functions. As a result, 10×n hash values are generated from the data A.

Then, minimum values 146 among the ten hash values from each hash function k (k is 1 to n) are obtained, and n minimum values 146 are obtained. The n minimum values 146 are aligned to construct a similar hash 147 for the data A.

The same processing is applied to the data B. That is, 7×n hash values are generated, minimum values 146 among the seven hash values from each hash function k are obtained, and n minimum values 146 are obtained. The n minimum values 146 are aligned to construct a similar hash 147 for the data B.

Assuming that the Hamming distance of the two similar hashes 147 for each of the data A and B calculated in this manner is H and a bit length of a hash function is b, an approximate value J of the strength S of the similarity relationship is given by the following equation.

$$J=\{(n-H)/n-(1/2)^b\}/\{1-(1/2)^b\}$$

Approximation accuracy of the approximate value J is improved as n and b are larger.

According to the above method, if the similar hash 147 of each data (each size is n×b bits) is managed, the strength S of the similarity relationship between two pieces of data can be approximately obtained. For example, when n=16 and b=8, only 16 B attached information (0.2%) per 8 KB data may be provided.

When the Hamming distance H of the similar hashes 147 of two pieces of data is 0, J=1. That is, the strength S of the similarity relationship between both data is 100%. When the Hamming distance H=0 (the similar hashes 147 are matched), the two pieces of data may have exactly the same contents. Therefore, the similar hash 147 may also be used for duplicate data detection for the deduplication processing. Although whether the contents are actually overlapped needs to be determined by comparing the entire 8 KB, comparison candidates can be narrowed down based on whether the similar hashes 147 match. Although an example of the similar hash calculation method has been described above, a similar hash calculation method is not limited thereto.

Figure 15:
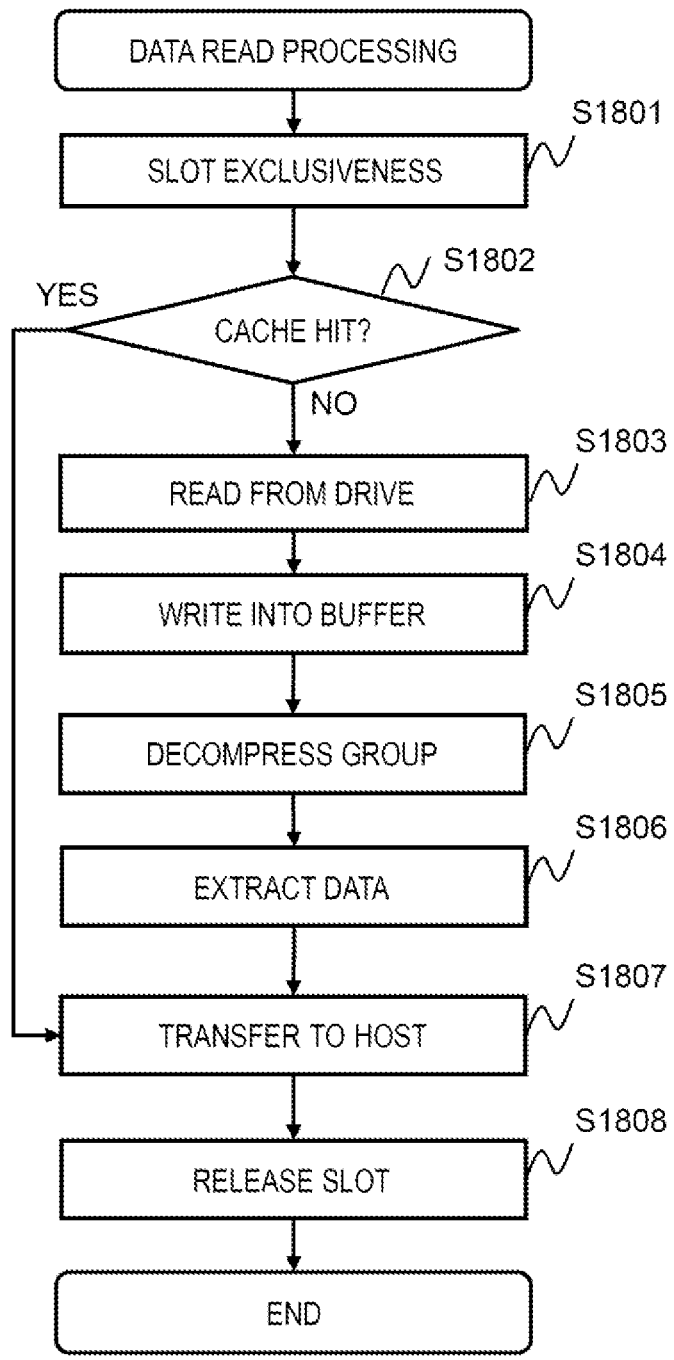
FIG. 15 is a flowchart showing a data read processing executed by the storage device in FIG. 2.

FIG. 15 is a flowchart showing a data read processing executed by the storage device in FIG. 2.

In FIG. 15, the read processing is started when the storage device 11 receives a read command from the host computer 30 of FIG. 2 via the network 31. In the read command, for example, a volume ID, an address, and a data size are designated.

In S1801, the processor 24 ensures exclusiveness of a slot specified from the designated address. When exclusiveness of the slot is ensured in other processing during ensuring the exclusiveness of the slot, the processor 24 waits for a certain period of time and then executes S1801.

Next, in S1802, the processor 24 determines whether data to be read exists in the cache area 203. When a determination result of S1802 is true, the processing proceeds to S1807.

On the other hand, when the determination result of S1802 is false, the processor 24 reads compressed group data including the target data from a drive constituting a RAID group in S1803. At this time, the processor 24 specifies the pool ID 73, the pool address 74, and the post-compression size 76 of the pool allocation management table 210 in FIG. 6 from the volume ID and the address designated by the host computer 30, and specifies a storage location and size on the drive of the compressed group data including the target data with reference to the drive ID 84 and the drive address 85 from the drive allocation management table 211 of FIG. 7.

Next, in S1804, the processor 24 writes the compressed group data read from the drive into the buffer area 202.

Next, in S1805, the processor 24 decompresses the compressed group data written in the buffer area 202.

Next, in S1806, the processor 24 extracts target data of a designated size from the decompressed group data in the buffer area 202.

Next, in S1807, the processor 24 transfers the target data in the buffer area 202 to the host computer 30. At the time of completing the data transfer, the host computer 30 recognizes that the read processing is ended.

Next, in S1808, the processor 24 releases the slot exclusiveness ensured in S1801.

The decompression processing in S1805 may be performed by the offload engine 214 in FIG. 2 in place of high-performance hardware in order to reduce load of the processor 24. At this time, the offload engine 214 can reduce consumption of a transfer band area of the memory 25 by using the buffer area 216 instead of the buffer area 202.

Figure 16:
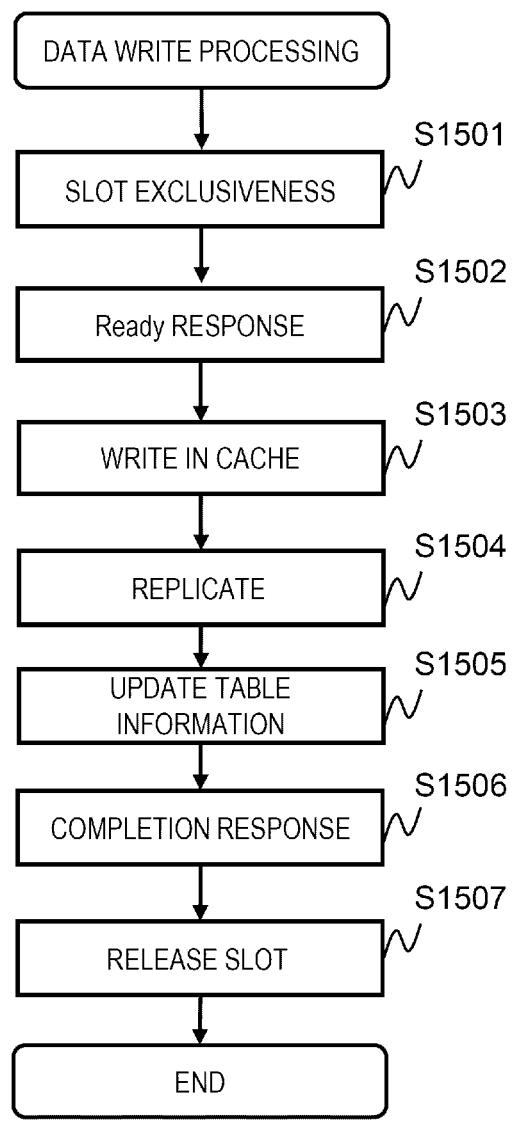
FIG. 16 is a flowchart showing a data write processing executed by the storage device in FIG. 2.

FIG. 16 is a flowchart showing a data write processing executed by the storage device in FIG. 2. In the following description, for example, those belongs to the storage controllers 22A and 22B in FIG. 1 are respectively distinguished by reference numerals "A" and "B", for example, the processor 24 in FIG. 2 corresponding to the storage controller 22A in FIG. 1 is described as a processor 24A.

In FIG. 16, the data write processing is started when the storage device 11 receives a write command from the host computer 30 in FIG. 2. In the write command, for example, a volume ID, an address, and a data size are designated. The data write processing is executed in (S1) to (S5) in FIG. 1.

In S1501, the processor 24A ensures exclusiveness of a slot specified from the designated address. At the same time of ensuring the exclusiveness of the slot, the processor 24A allocates a part of the cache area 203A into which data is to be written.

Next, in S1502, the processor 24A responds to the host computer 30 with "Ready" indicating that the write processing is ready. The processor 24A receives write data from the host computer 30 that received "Ready".

Next, in S1503, the processor 24A writes the write data received from the host computer 30 to the slot area allocated in the cache area 203A.

Next, in S1504, the processor 24A transfers the write data stored in the cache area 203A from the storage controller 22A to the storage controller 22B, and performs replication by storing the data in the cache area 203B.

Next, in S1505, the processor 24A updates the group management table 212 in FIG. 9 and the memory allocation management table 213 in FIG. 10. The write data has not been performed with deduplication and similar grouping (collectively referred to as pre-compression data construction processing) by now. The similar grouping is a grouping of data in a similar relationship. Therefore, the processor 24A sets "None" in the address 905, the group number 906, and the position number 907 of the system VOL slot corresponding to the host VOL slot of the write data in the group management table 212. The processor 24A sets the cache state of the write data to "Dirty" in the cache state 912 corresponding to the host VOL slot of the write data in the memory allocation management table 213, and sets a write data storage destination address of the cache area 203A in the cache address 913.

Next, in S1506, the processor 24A returns a completion response to the host computer 30 via the network 31 as the write processing is completed.

Next, in S1507, the processor 24A releases the exclusiveness of the slot ensured in S1501, and ends the write processing.

Figure 17:
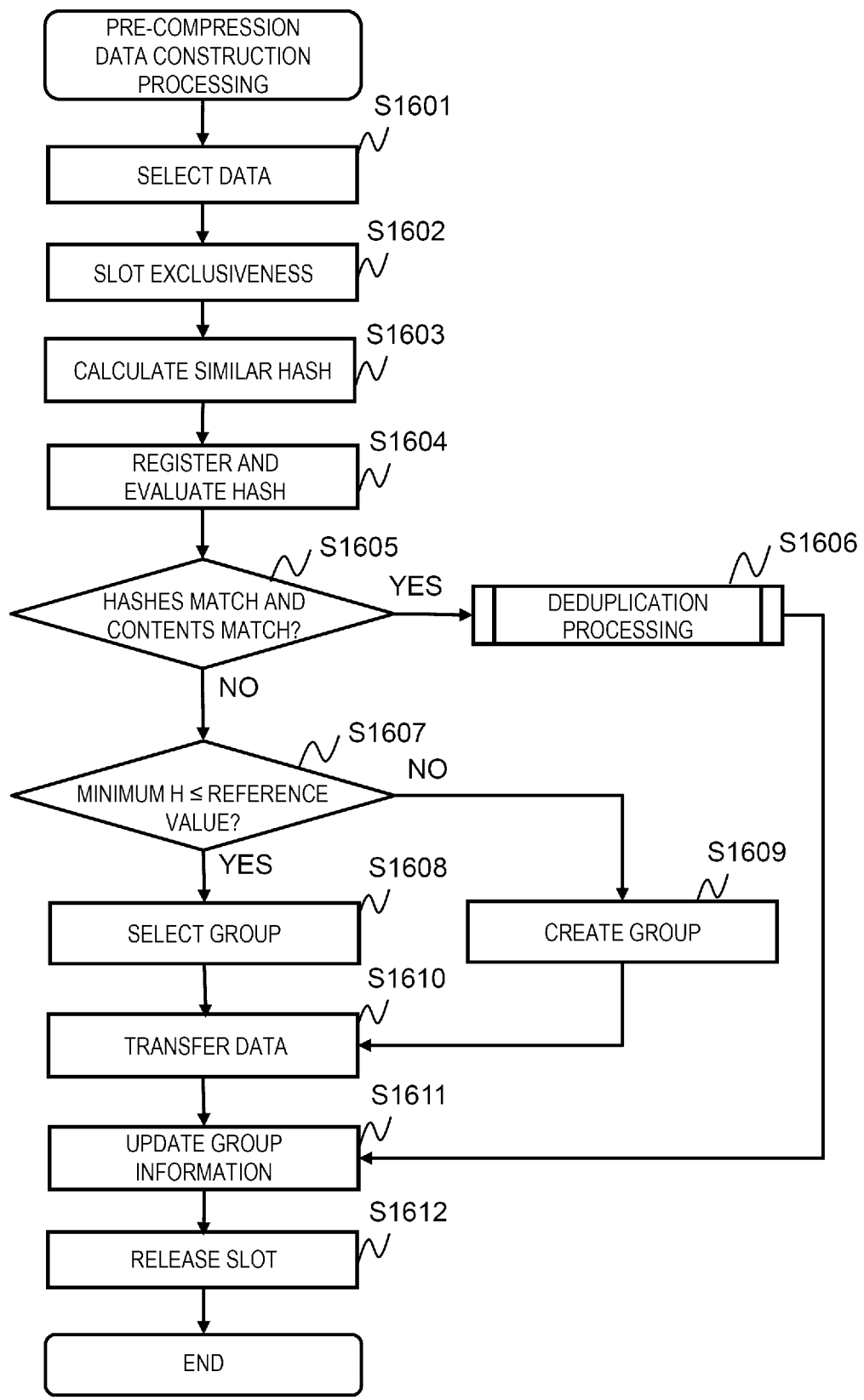
FIG. 17 is a flowchart showing a pre-compression data construction processing executed by the storage device in FIG. 2.

FIG. 17 is a flowchart showing a pre-compression data construction processing executed by the storage device in FIG. 2.

In FIG. 17, the pre-compression data construction processing is performed by the processor 24 after the write processing is completed. The pre-compression data construction processing may be executed immediately after the end of the write processing, or may be executed after a processing if the processing is required to be performed with priority. The pre-compression data construction processing is executed in (S6) to (S7) in FIG. 1.

In 51601, the processor 24 selects write data on the host VOL stored in the cache area 203.

Next, in S1602, the processor 24 ensures exclusiveness of the slot specified from the address of the selected write data.

Next, in S1603, the processor 24 calculates a similar hash of the selected data, for example, in accordance with the method described in FIG. 14.

Next, in S1604, the processor 24 registers the calculated similar hash in a hash table, calculates the Hamming distance H among previously registered one or more similar hashes, and evaluates the similarity degree with other data.

Next, in S1605, when there is data in which the similar hashes match and contents also match, the processor 24 executes the deduplication processing S1606 between the data and the write data, and the processing proceeds to S1611.

In the deduplication processing S1606, the processor 24 specifies the slot and the group on the system VOL including the data whose content match with that of the write data, and specifies a position number of the matching data in the group. The processor 24 updates the group management table 212 in FIG. 9 in S1611 based on the specification result. That is, the processor 24 sets the values of the system VOL address 905, the group number 906, and the position number 907 to be equal. At this time, for example, the group management table 212 indicates that the target data of the entries in the fifth and eighth rows have been deduplicated.

On the other hand, in S1605, when there is no data in which the similar hashes match, or when there is no data that the similar hashes match and the contents also match, the processing proceeds to S1607.

Next, in S1607, the processor 24 determines whether a minimum value of the Hamming distance H is equal to or less than a predetermined reference value. If the determination result is true, the processor 24 determines that there is data in a similar relationship, and selects a group on the system VOL including data that causes the minimum value in S1608, and the processing proceeds to S1610.

On the other hand, if the determination result of S1607 is false, the processor 24 determines that there is no data in a similar relationship, and creates a new group on the system VOL in S1609. At this time, the processor 24 allocates a part of the cache area 203 as a group data storage destination, and proceeds to S1610.

Next, in S1610, the processor 24 transfers the write data on the host VOL to a cache area part corresponding to the selected or created group on the system VOL.

Next, in S1611 transferred from S1610, the processor 24 updates the group management table 212. That is, the processor 24 sets an address of the slot including the group on the system VOL selected or created in the system VOL address 905, sets the number of the group in the group number 906, and sets a position in the group in which the write data is transferred in the position number 907. When the group to which the write data was transferred is a newly created group (that is, through S1609) and is a first group in the slot including the group, the processor 24 further adds an entry of the slot to the memory allocation management table 213. That is, the processor 24 sets the ID of the system VOL in the VOL_ID 908, and sets the slot address including the group in the VOL address 909. "Not completed" is set in the BF transfer state 910, and "None" is set in the BF address 911. "Dirty" is set in the cache state of the group in the cache state 912. An address of the allocated part of the cache area 203 is set in the cache address 913.

Next, in S1612, the processor 24 releases the exclusiveness of the slot specified from the address of the write data, and ends the pre-compression data construction processing.

The similar hash calculation in S1603 and the hash registration and evaluation in S1604 may be performed by the offload engine 214 in FIG. 2 in place of high-performance hardware in order to reduce the load of the processor 24. At this time, the offload engine 214 can reduce the consumption of the transfer band area of the memory 25 by using the memory 215 as a work memory.

The hash table for registering a similar hash holds a similar hash of data staying on the cache. When the data is removed from the cache, the similar hash of the data is deleted from the hash table.

In S1610, when there is no area for storing write data in the cache area 203 of the selected group, the processor 24 selects data having a lowest similarity with other data in data belonging to the group, and excludes the data from the group to ensure the storage destination of the write data. That is, the processor 24 sets "None" in the system VOL address 905, the group number 906, and the position number 907 of the entry of the excluded target data in the group management table 212. This means that the excluded data is ready to be subjected to deduplication and similar grouping again (see FIG. 16).

Figure 18:
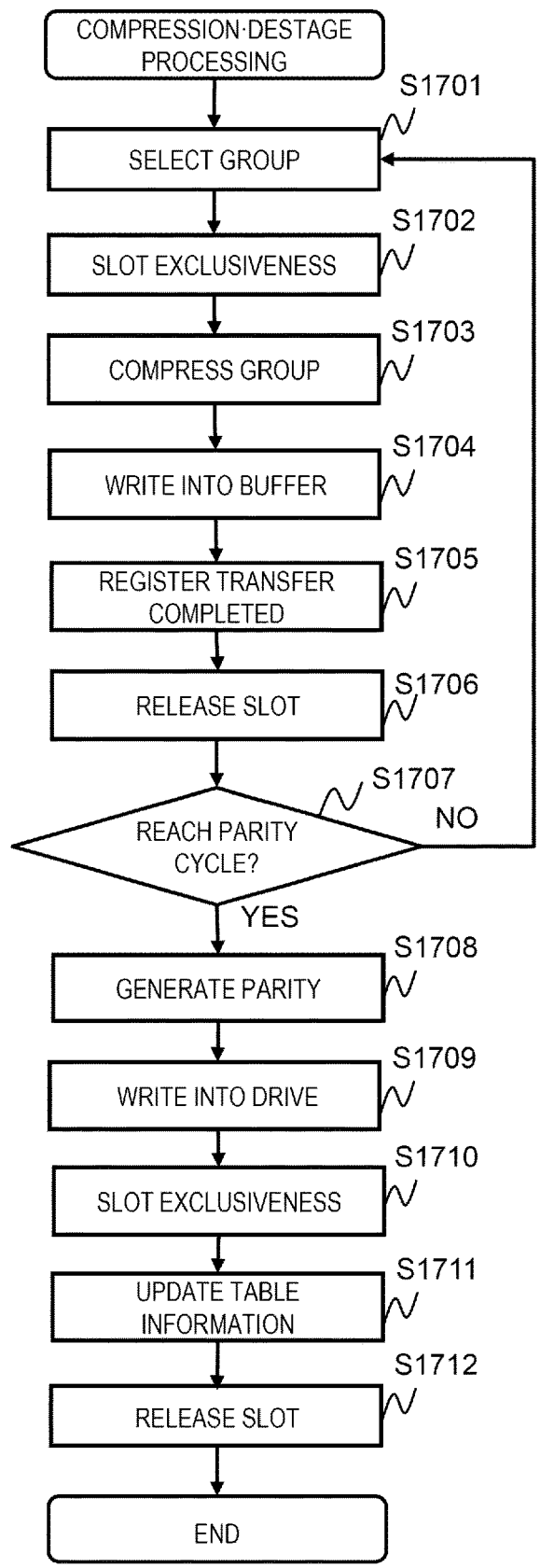
FIG. 18 is a flowchart showing a compression and destage processing executed by the storage device in FIG. 2.

FIG. 18 is a flowchart showing a compression and destage processing executed by the storage device in FIG. 2.

In FIG. 18, compression and destage processing is performed asynchronously due to a fact that a "Dirty" ratio of the cache area 203 is equal to or larger than a threshold value for the group data on which the pre-compression data construction processing has ended. However, if the processor 24 is in a low-load state, the destage processing may be started even if the "Dirty" ratio is less than the threshold value. The destage processing may be started periodically using a timer regardless of the "Dirty" ratio. The compression and destage processing is executed in (S8) to (S10) in FIG. 1.

In S1701, the processor 24 selects a group to be destaged among the groups included in the "Dirty" state slot in the cache area 203. Specifically, as described above, the processor 24 selects the group having the highest similarity among the groups included in the LRU lot or the groups included in the plurality of slots in which a long time has elapsed since the last access.

Next, in S1702, the processor 24 ensures the exclusiveness of the system VOL slot to which the group to be destaged belongs, and further ensures exclusiveness of the host VOL slot to which the data transferred to the group to be destaged belongs.

Next, in S1703, the processor 24 reads the group data (128 KB) to be destaged, and performs reversible compression processing.

Next, in S1704, the processor 24 allocates a part of the buffer area 202 as a storage destination of the compressed group data (less than 128 KB), and writes the compressed group data to the storage destination. In the address allocation of the buffer area 202, the addresses for the parity cycle may be allocated collectively in advance since it is clear that the allocation is repeated until the compressed groups for the parity cycle are collected.

Next, in S1705, the processor 24 updates the BF transfer state 910 of the memory allocation management table 213 of FIG. 10 to "completed". In addition, an address of the allocated buffer part is set to the BF address 911.

Next, in S1706, the processor 24 releases the slot exclusiveness ensured in S1702.

Next, in S1707, the processor 24 calculates an accumulation amount of the compressed group data in the buffer. When the accumulation amount of the compressed group data is smaller than the parity cycle, the processor 24 returns to S1701 and additionally selects a group to be destaged.

On the other hand, if the compressed group data for the parity cycle is accumulated in the buffer area 202, the processing proceeds to S1708. Since the size of the compressed group data is variable, the accumulation amount in the buffer area 202 does not necessarily match the parity cycle. The processing may proceed to S1708 before the parity cycle is reached.

Next, in S1708, the processor 24 generates a parity from a compressed group data sequence accumulated in the buffer area 202.

Next, in S1709, the processor 24 writes the compressed group data sequence and the generated parity into the drive 29 constituting the RAID group. After writing to the drive 29, the processor 24 releases the used part of the buffer area.

Next, in S1710, the processor 24 ensures the exclusiveness of the system VOL slot which includes the group to be destaged, and further ensures exclusiveness of the host VOL slot to which the data transferred to the group to be destaged belongs.

Next, in S1711, the processor 24 updates the cache state of the group to "Clean" in the cache state 912 of the system VOL slot including the group to be destaged in the memory allocation management table 213. As a result, when the cache states of the two groups both become "Clean", the processor 24 sets the BF address 911 to "None" and releases the used part of the buffer area 202. The system VOL slot is in the "Clean" state and can be released from the cache at any time to create a cache resource in a "Free" state. Further, the processor 24 updates the cache state of the data to "Clean" in the cache state 912 of the host VOL slot to which each piece of data transferred to the group to be destaged belongs in the memory allocation management table 213. As a result, the host VOL slot in which all the cache states 912 are "Clean" can be released from the cache at any time to create the cache resource in the "Free" state.

Next, in S1712, the processor 24 releases the exclusiveness of the host VOL slot which includes the group to be destaged, and further releases exclusiveness of the host VOL slot to which the data transferred to the group to be destaged belongs, and the processing ends.

In the above compression and destage processing, the group released from the cache has a low access frequency, and data with a high similarity relationship is given priority. Therefore, since a potential of a cache hit from the host computer 30 becomes higher, the access performance is improved. In addition, since the compression rate of the data stored in the drive 29 is higher, a data reduction efficiency is improved.

The reversible compression in S1703 may be performed by the offload engine 214 in FIG. 2 in place of high-performance hardware in order to reduce the load of the processor 24. At this time, the offload engine 214 can reduce consumption of transfer band area of the memory 25 by using the buffer area 216 of the memory 215 instead of the buffer area 202.

Figure 19:
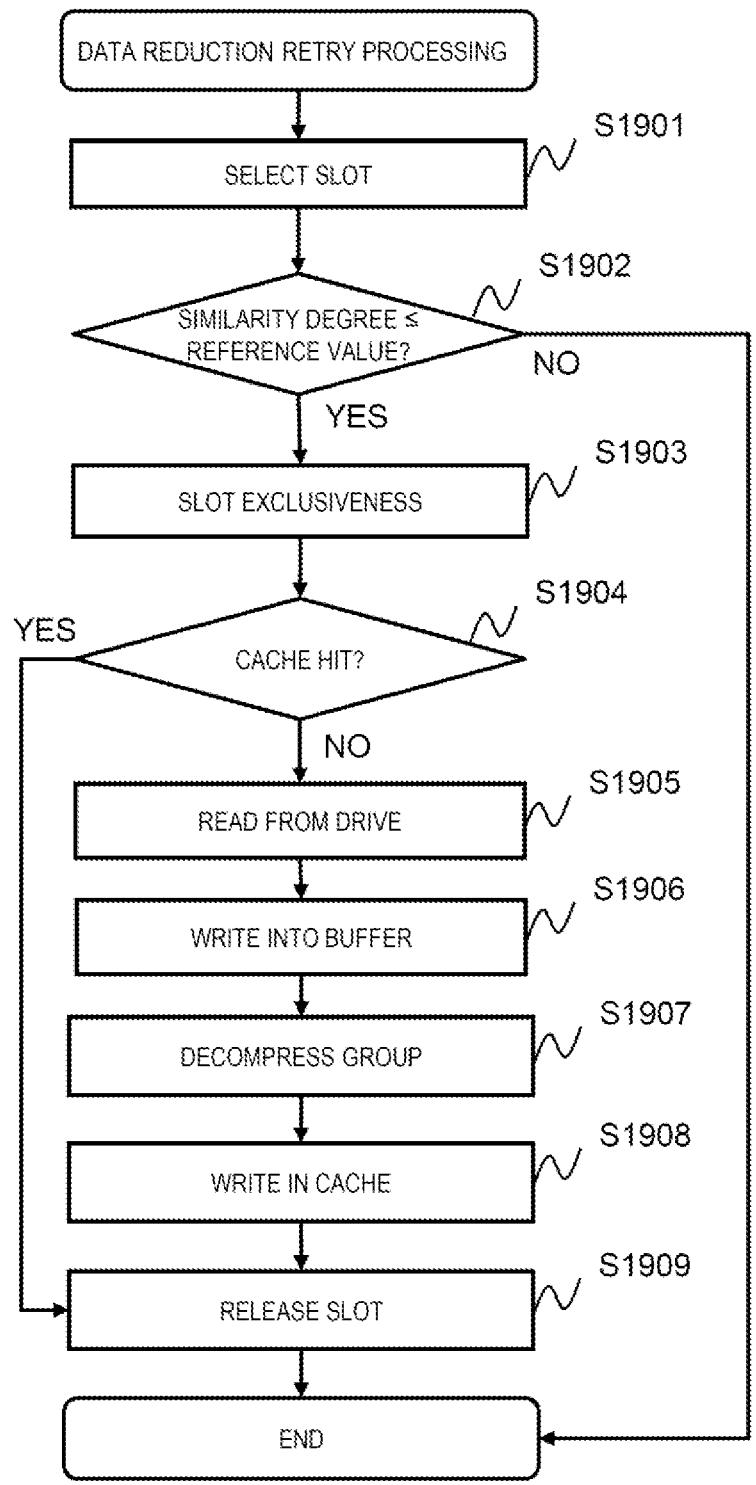
FIG. 19 is a flowchart showing a data deletion retry processing executed by the storage device in FIG. 2.

FIG. 19 is a flowchart showing a data reduction retry processing executed by the storage device in FIG. 2.

In FIG. 19, the data reduction retry processing returns the data constituting the destaged compressed group in the drive 29 in FIG. 2 to the cache area 203 again so that deduplication and similar grouping can be retried. When the degree of similarity degree 77 of the destaged group data is poor, a data reduction rate of the storage device 11 can be improved because a group including data with stronger similarity relationship than before can be constructed by the data reduction retry processing.

In 51901, the processor 24 selects one of the system VOL slots managed in the pool allocation management table 210 in FIG. 6.

Next, in S1902, the processor 24 determines whether the similarity degree 77 of the group included in the system VOL slot is equal to or less than a predetermined reference value in the pool allocation management table 210.

If the determination result of S1902 is false, the processor 24 does not need the data reduction of the system VOL slot, and the processing ends. If the determination result is true, the processing proceeds to S1903.

Next, in S1903, the processor 24 ensures the exclusiveness of the system VOL slot. Further, referring to the group management table 212 of FIG. 9, data of a host VOL slot constituting a group having a similarity degree in the system VOL slot equal to or less than a reference value is specified, and exclusiveness of the host VOL slot is also ensured.

Next, in S1904, the processor 24 refers to the memory allocation management table 213 in FIG. 10, and determines whether or not the specified data exists in the cache area 203.

When the determination result of S1904 is true, the processor 24 sets "Dirty" in the cache state 912 of the data in the memory allocation management table 213. In the group management table 212, "None" is set in the system VOL address 905, the group number 906, and the position number 907 of the entry of the data of the host VOL slot, and a correspondence relationship with an existing system VOL slot group is disconnected. This means that the data is ready to be subjected to deduplication and similar grouping (see FIG. 16). Then, the processing proceeds to S1909.

On the other hand, when the determination result of S1904 is false, the processor 24 reads the compressed group data in which the similarity degree is determined to be equal to or less than the reference value in S1902 from the drive of the RAID group in S1905. At this time, the processor 24 specifies the pool ID 73, the pool address 74, and the post-compression size 76 of the pool allocation management table 210 in FIG. 6, and specifies a storage location and size on the drive of the compressed group data with reference to the drive ID 84 and the drive address 85 from the drive allocation management table 211.

Next, in S1906, the processor 24 writes the compressed group data to the buffer area 202.

Next, in S1907, the processor 24 decompresses the compressed group data on the buffer area 202.

Next, in S1908, the processor 24 allocates an area for storing the data in the cache area 203, and writes the data extracted from the decompressed group in the buffer area 202 to the allocated area. At this time, the processor 24 sets the ID of the host VOL to which the data belongs to the VOL_ID 908 of the memory allocation management table 213, sets the address of the host VOL slot to which the data belongs in the VOL address 909, sets "Dirty" in the cache state 912, and registers the address of the allocated area in the cache address 913. The processor 24 deletes the entry of the data of the host VOL slot in the group management table 212, and disconnects the correspondence relationship with the existing system VOL slot group. This means that the data is ready to be subjected to deduplication or similar grouping (see FIG. 16). Then, the processing proceeds to S1909.

Next, in S1909, the processor 24 releases the exclusiveness of the system VOL slot and the host VOL slot ensured in S1903, and ends the data reduction retry processing.

The decompression processing in S1907 may be performed by the offload engine 214 in FIG. 2 in place of high-performance hardware in order to reduce the load of the processor 24. At this time, the offload engine 214 can reduce consumption of transfer band area of the memory 25 by using the buffer area 216 of the memory 215 instead of the buffer area 202.

Figure 20:
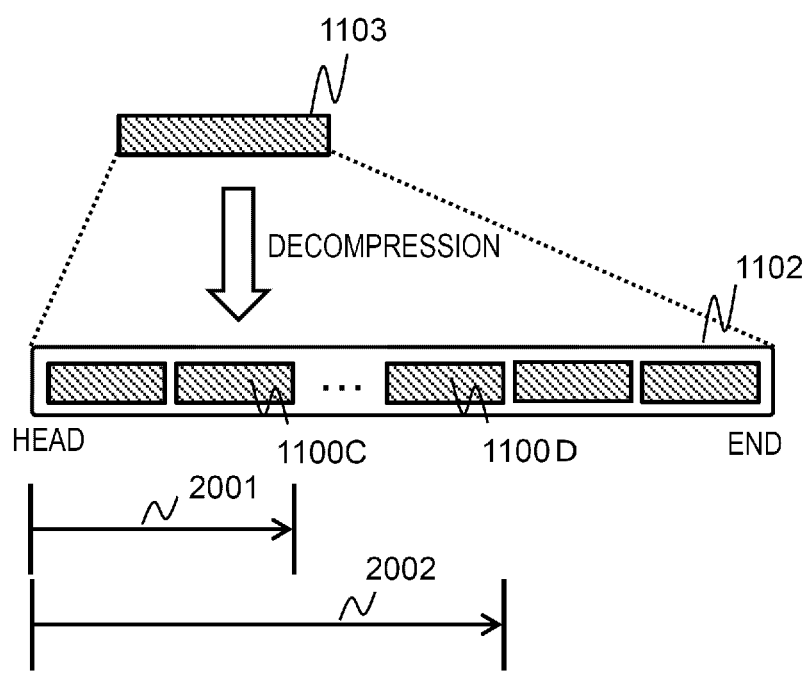
FIG. 20 is a diagram showing a process of data decompression processing in the storage device in FIG. 2.

FIG. 20 is a diagram showing a process of data decompression processing in the storage device in FIG. 2.

In FIG. 20, in a processing of grouping a plurality of pieces of 8 KB data in a similar relationship, the processor 24 optimizes a data arrangement order and decompression processing, thereby improving the performance of data read processing.

In the data read processing, when the data that has received the read command from the host computer 30 is stored in the drive 29 instead of the cache area 203, the processor 24 decompresses the compressed group data 1103, restores groups 1102 of a 128 KB size, extracts the 8 KB data to be read from the restored data, and responds to the host computer 30.

At this time, in the decompression processing of the compressed group data, the processor 24 restores the compressed group data in order from a head of the 8 KB data. When the read target data is 1100C, the processor 24 may decompress a part of a range 2001 until restoration. When the read target data is 1100D, the processor 24 may decompress a part of a range 2002 until restoration. That is, as the data to be read is closer to the head of the group data, the processor 24 can restore the data in a shorter time.

Using this characteristic, the processor 24 suspends the decompression processing of the group data at the time when the data to be read can be restored. Further, the processor 24 divides the address space of the host VOL into a plurality of sections, and checks the access frequency of each section in a predetermined time range (for example, past 10 hours).

At the time of similar grouping, the processor 24 arranges data in a section having a higher access frequency from the host computer 30 closer to the head of the group (the position number is smaller). Data in a section having a lower access frequency is arranged at a position closer to an end of the group (the position number is larger). Accordingly, the storage device 11 can shorten average response time for the read command from the host computer 30.

The invention is not limited to the above-mentioned embodiment, and includes various modifications. For example, the embodiment described above is described in detail for better understanding of the invention. The invention is not necessarily limited to embodiment including all configurations described above.

A part of or all configurations, functions, processing units, processing methods and the like described above may be implemented by hardware such as through design using an integrated circuit. That is, there is an embodiment other than the modified example in which similar hash calculation, hash registration, hash evaluation, and reversible compression and decompression processing are performed by proxy processing of high-speed hardware of an offload engine.

The configurations, functions, and the like described above may also be implemented by software by a processor interpreting and executing a program for implementing the functions. Information such as a program, a table, or a file for implementing the functions can be stored in a storage device such as a non-volatile semiconductor memory, an HDD, and an SSD, or a computer readable non-transitory data storage medium such as an IC card, an SD card, and a DVD.

Control lines and information lines show those considered to be necessary for description, and not all of the control lines and the information lines are necessarily shown on the product. In practice, it may be considered that almost all the configurations are connected with each other.

The invention is not limited to the above-mentioned embodiment, and includes various modifications. For example, the above-mentioned embodiment have been described in detail for easy understanding of the present invention, and are not necessarily limited to those including all the configurations described above. Apart of the configuration of one embodiment can be replaced with the configuration of another embodiment, and the configuration of another embodiment can be added to the configuration of one embodiment. A part of the configuration of each embodiment may be added to, deleted from, or replaced with another configuration. A part or all of the above-mentioned configurations, functions, processing units, processing methods, and the like may be implemented by hardware, for example, by designing an integrated circuit.

What is claimed is:

1. A storage system comprising:
a drive having a physical storage area; and
a controller coupled to the drive and configured to receive data of a plurality of write requests from a host that are to be written into the drive, wherein:
the controller includes:
a cache area configured to store the data to be written into the drive, and
the controller:
groups a plurality of non-identical pieces of data stored in the cache area based on a similarity degree among the plurality of pieces of data into a plurality of groups,
selects a group, which has an access frequency, on a group unit basis, which is smaller than a first set value and which has the similarity degree among data included in the group that is larger than a second set value and has a highest similarity among the plurality of groups,
compresses data of the selected group in the group unit basis to form a compressed group,
repeats the steps of selecting and compressing until a total amount of the compressed data for a plurality of the compressed groups satisfies a parity cycle,
after the total amount of the compressed data for the plurality of the compressed groups reaches the parity cycle, generates a parity from the compressed data for the plurality of the compressed groups, and
stores the compressed data for the plurality of the compressed groups and the parity in the drive,
wherein for another group whose access frequency, on the group unit basis, is higher than the first set value, all data of the another group is maintained in the cache area without being compressed.

2. The storage system according to claim 1, wherein when a dirty cache ratio in the cache area is equal to or larger than a predetermined value, the controller selects and compresses the group of data stored in the cache area.

3. The storage system according to claim 1, wherein the data to be grouped includes a plurality of pieces of data stored in the cache area based on separate write requests.

4. The storage system according to claim 1, wherein the controller
manages the similarity degree among data included in the plurality of the compressed groups stored in the drive,
selects a group having a similarity degree among data equal to or less than a reference value from the plurality of the compressed groups stored in the drive, and reads and decompresses the compressed data included in the selected group from the drive, and stores the decompressed data in the cache area for regrouping and recompression.

5. The storage system according to claim 1, wherein the controller:

for a first data and a second data included in a same group, the first data having a higher access frequency than the second data, compresses the same group including the first data and the second data to arrange the first data and the second data in a manner so that a data range to be decompressed to restore the first data is smaller than the data range to be decompressed to restore the second data, and performs decompression of the compressed group from compressed data of a head side of the same group.

6. The storage system according to claim 1, wherein the controller evaluates the similarity degree based on a hash value of the data, and an input value used to calculate the hash value is a plurality of character strings of the same length included in the data, and an appearance frequency of each of the character strings in the data is equal to or more than a predetermined number.

7. The storage system according to claim 1, wherein the controller performs deduplication determination on data related to a write request, performs deduplication processing when deduplication is necessary, and performs the grouping, the compression, and the storage of the data in the drive when deduplication is unnecessary.

8. A data compression method for a storage system, wherein the storage system includes:

a drive having a physical storage area; and a controller coupled to the drive and configured to receive data of a plurality of write requests from a host that are to be written into the drive, and the controller includes a cache area configured to store the data to be written into the drive, and the method, performed by the controller, comprises the steps of:

grouping a plurality of pieces of non-identical data stored in the cache area based on a similarity degree among the plurality of pieces of data into a plurality of groups, selecting a group, which has an access frequency, on a group unit basis, which is smaller than a first set value and which has the similarity degree among data included in the group that is larger than a second set value and has a highest similarity among the plurality of groups, compressing data of the selected group in the group unit basis to form a compressed group, repeating the steps of selecting and compressing until a total amount of the compressed data for a plurality of the compressed groups satisfies a parity cycle, after the total amount of the compressed data for the plurality of the compressed groups reaches the parity cycle, generating a parity from the compressed data for the plurality of the compressed groups, storing the compressed data for the plurality of the compressed groups and the parity in the drive, wherein for another group whose access frequency, on the group unit basis, is higher than the first set value, all data of the another group is maintained in the cache area without being compressed.

9. The storage system according to claim 1, wherein the grouping of the plurality of non-identical pieces of data is performed by the controller after deduplication processing.

10. The storage system according to claim 1, wherein the controller calculates the similarity degree among the plurality of non-identical pieces of data stored in the cache area.

11. The storage system according to claim 10, wherein the controller calculates the similarity degree based on a number of common words between the non-identical pieces of data stored in the cache memory.

12. The data compression method according to claim 8, further comprising the step of performing, by the controller, deduplication before the step of grouping of the plurality of non-identical pieces of data.

13. The data compression method according to claim 8, further comprising the step of calculating, by the controller, the similarity degree among the plurality of non-identical pieces of data stored in the cache area.

14. The data compression method according to claim 13, wherein the step of calculating the similarity degree is performed based on a number of common words between the non-identical pieces of data stored in the cache memory.

* * * * *